United States Patent [19]

Yach

[11] Patent Number: 5,048,891
[45] Date of Patent: Sep. 17, 1991

[54] SEAT POSITION CHANGING APPARATUS FOR A BICYCLE OR CYCLE-TYPE MACHINE

[76] Inventor: Thomas L. Yach, 3048 N. Ocean Blvd., Ft. Lauderdale, Fla. 33308

[21] Appl. No.: 429,075

[22] Filed: Oct. 30, 1989

[51] Int. Cl.$^5$ .............................................. B60N 2/38
[52] U.S. Cl. ............................................. 297/195
[58] Field of Search ................. 297/195; 248/284, 371, 248/421; 280/220, 288.4

[56] References Cited

FOREIGN PATENT DOCUMENTS

| 209202 | 10/1959 | Austria | 297/195 |
|---|---|---|---|
| 470887 | 6/1914 | France | 297/195 |
| 22323 | 1/1921 | France | 297/195 |
| 2478009 | 9/1981 | France | 297/195 |

Primary Examiner—Peter A. Aschenbrenner

[57] ABSTRACT

A seat position changing apparatus, controllable by a riding bicycle rider or operating cycle type machine operator, comprising a movable supporting structure (33), a releasable locking mechanism (37), and a handlebar (109) mounted actuating control (106), enabling multi-directional combined movement of the seat (72) within a plurality of detent-type intermittently lockable positions, by, an identically repeatable triggering-type activating action by the rider or operator of the actuating control (106), which is connected by a cable (46) to the releasable locking mechanism (37). The movable supporting structure (33) is spring (104) biased to move the seat (72), after unweighting by the rider or operator, in a generally forward and upward direction upon activation of the actuating control (106), which releases the releasable locking mechanism (37), which, itself, is lockably biased enabling it to find and relock into another detent-type intermittently lockable position, afterwhich, the movable supporting structure (33), upon being freed to move again by release of the releasable locking mechanism (37) by activation of the actuating control (106) by the rider or operator, can enable the seat (72) to move in a generally rearward and downward direction from a rearward weighting by the rider or operator, when, again, the lockably biased releasable locking mechanism (37) will find and relock into another detent-type intermittently lockable position.

9 Claims, 20 Drawing Sheets

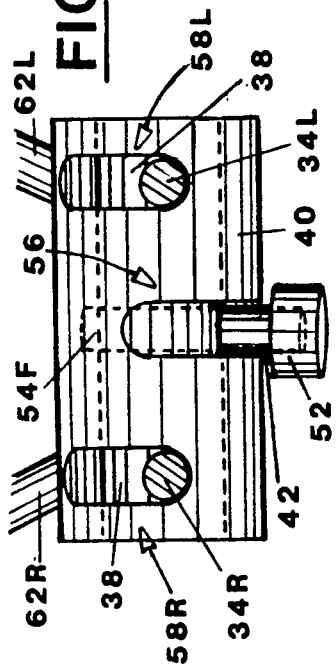
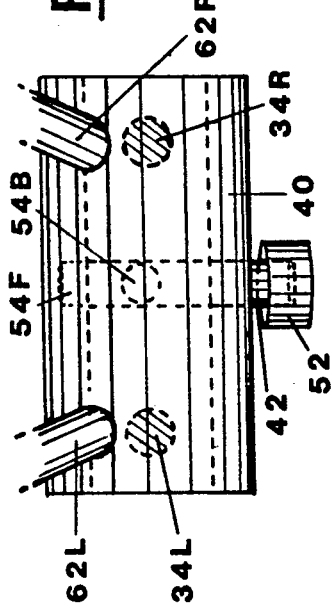
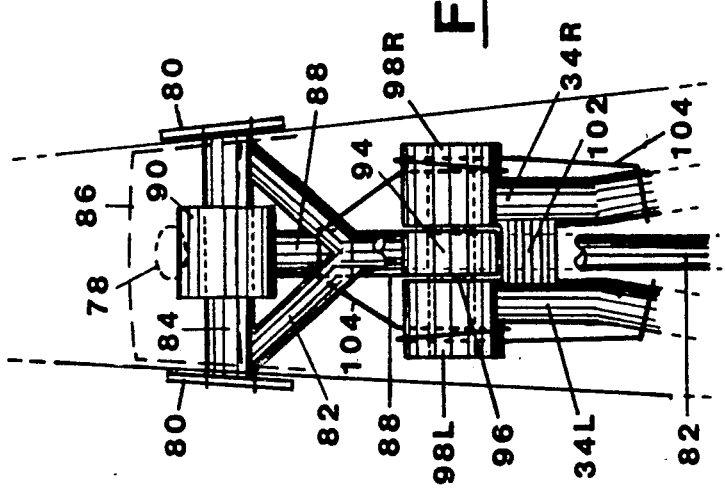
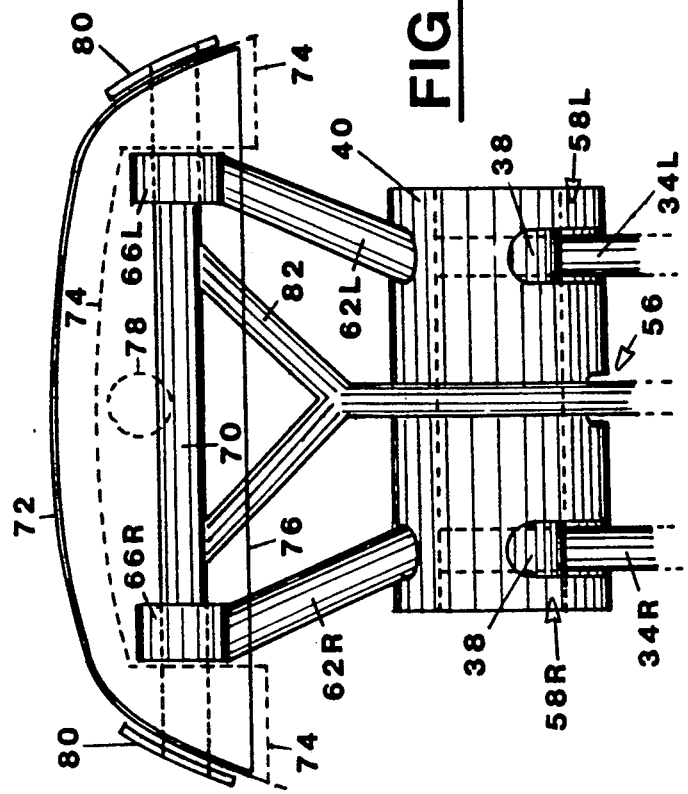

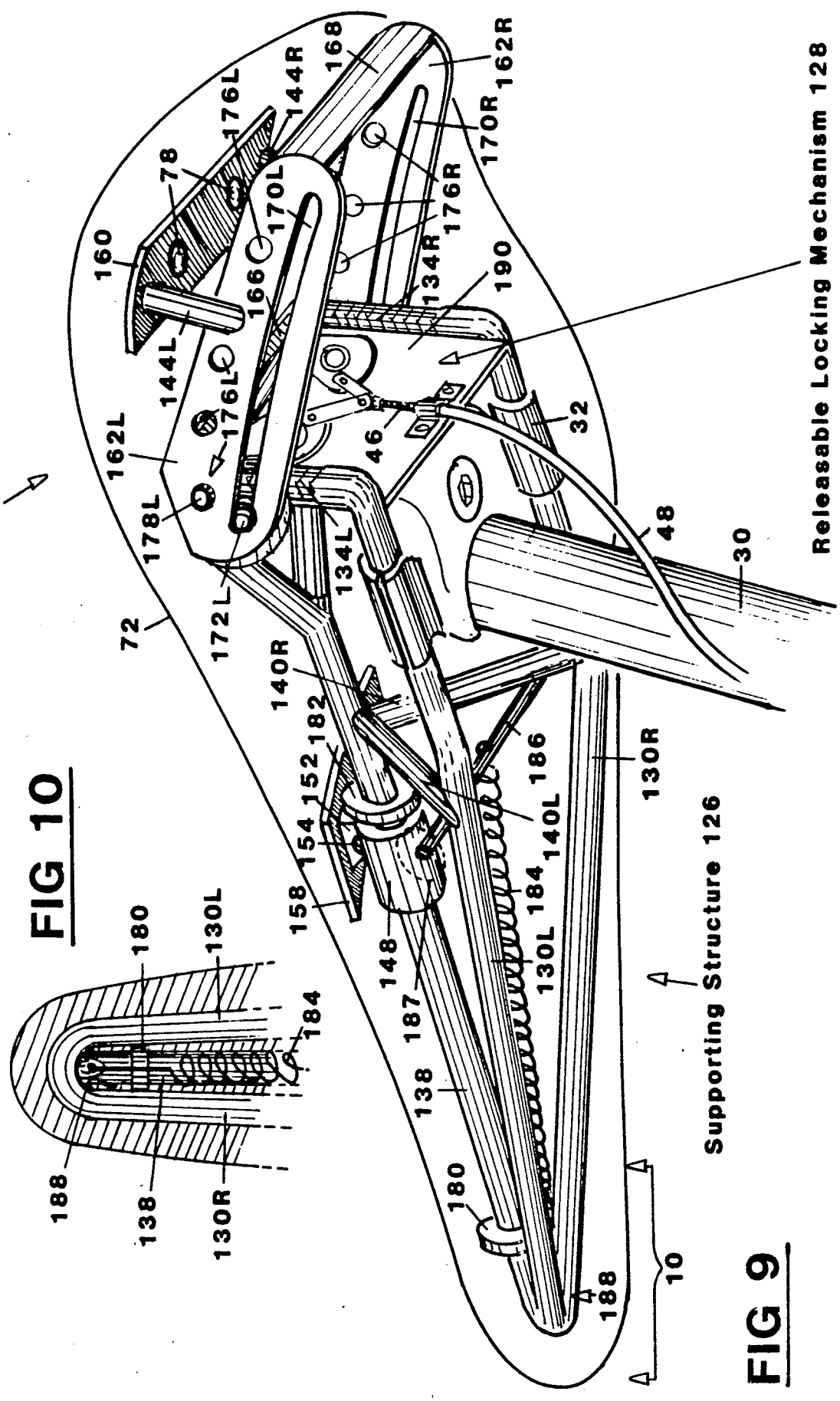

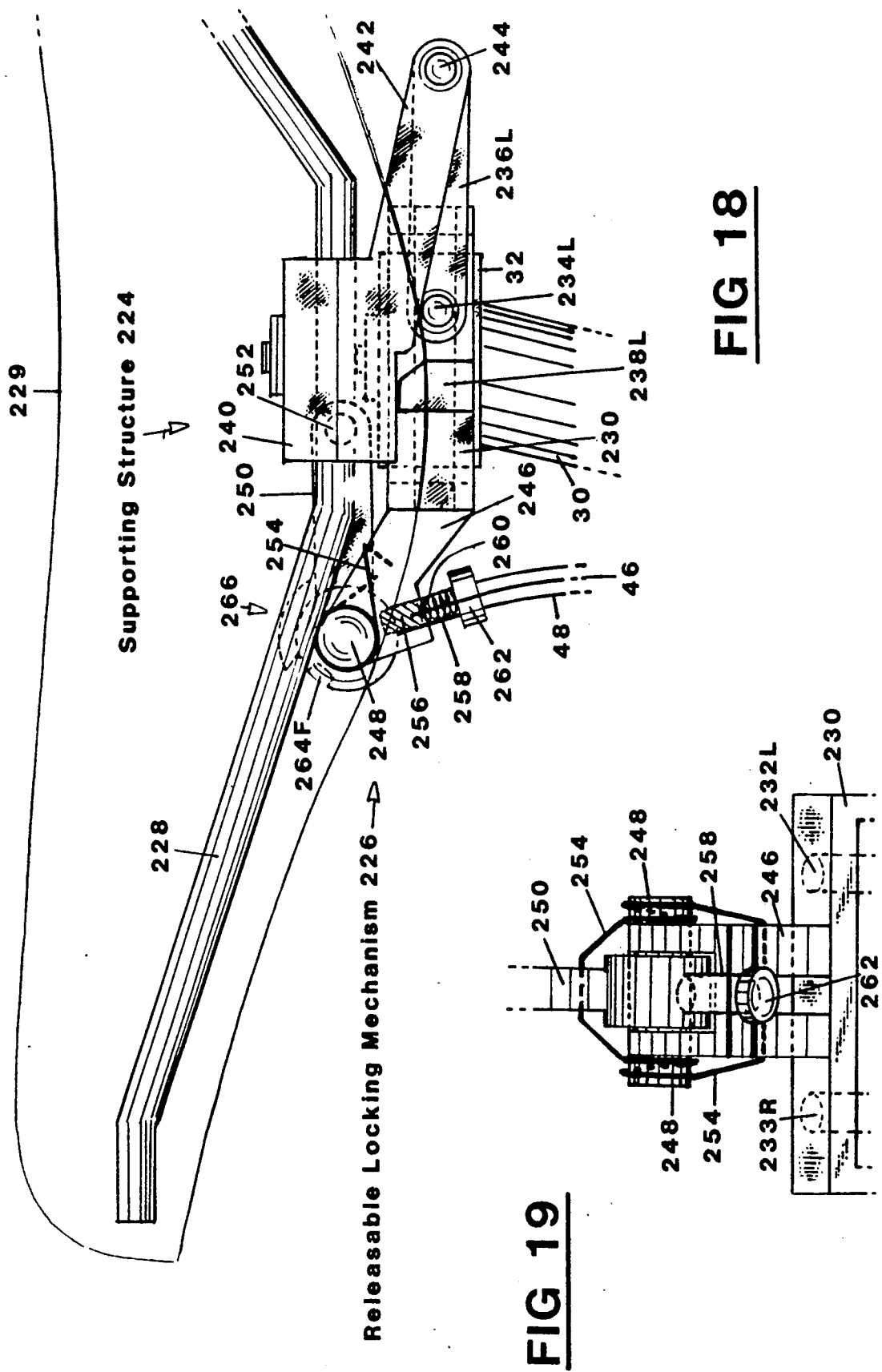

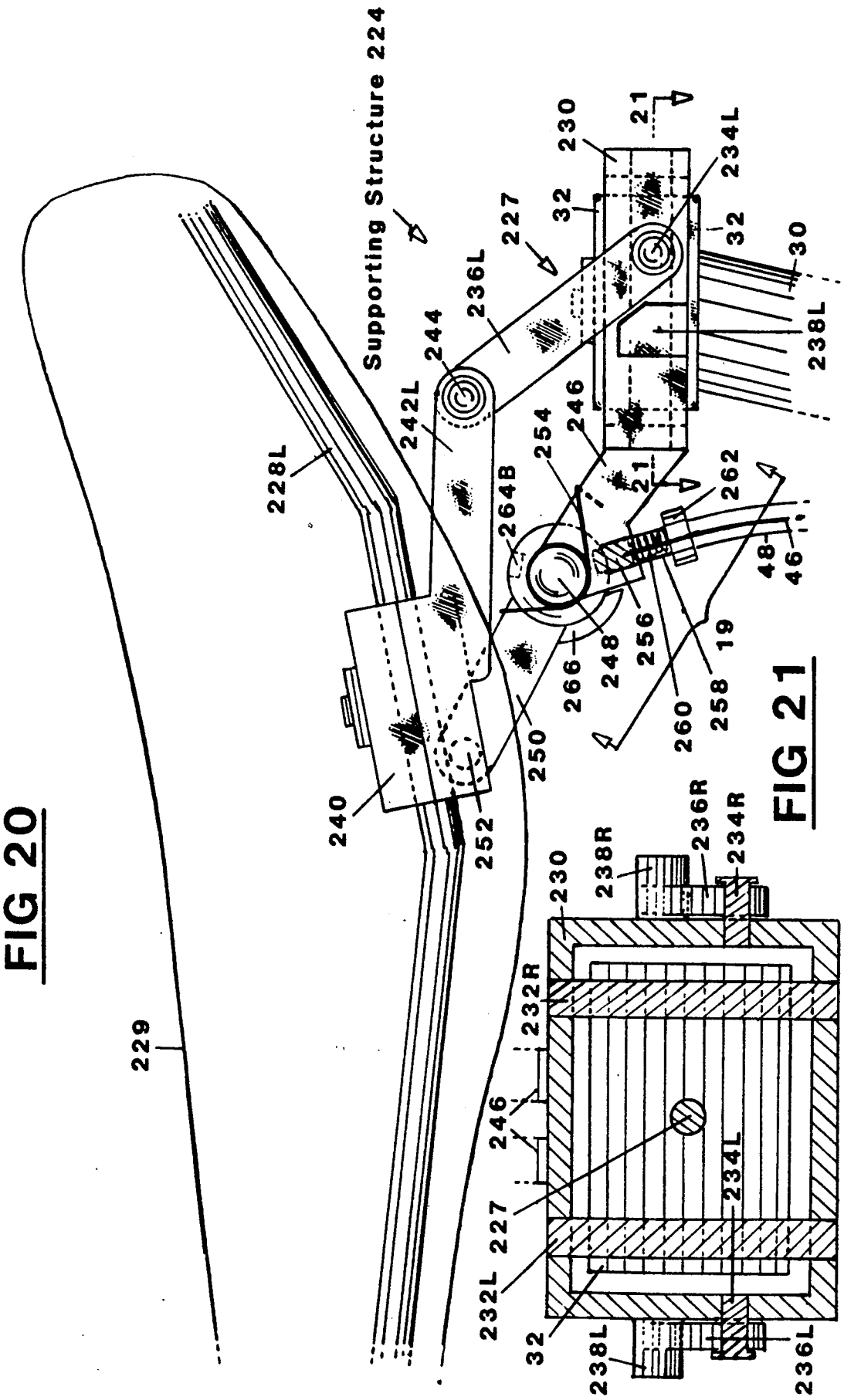

SEAT POSITION CHANGING APPARATUS FOR A BICYCLE OR CYCLE-TYPE MACHINE

BACKGROUND

1. Field of Invention

This invention relates to a bicycle or cycle-type machine, specifically to an apparatus enabling positioning change capabilities of the bicycle's or cycle-type machine's seat, controllable by a bicycle rider while riding the bicycle or an operator while operating the cycle-type machine.

2. Background Discussion of Prior Art

The conventional static adjustment capabilities of bicycle seats in the horizontal, vertical, and angular directions is well known and old in the prior art. A modification which is now well known incorporates a coil sprung seat post with a quick release clamp, used primarily in mountain bike racing, enabling adjusting of the seat up or down, while riding, in order to provide for lower center of gravity and more stable bike handling on fast descents.

U.S. Pat. No. 4,772,069 to Szymski, 9-20-88, shows a multiposition horizontal, vertical, and angular seat adjustment capability. U.S. Pat. No. 3,302,970 to Rizzato, 2-7-67, shows a releasably lockable hinged seat post and separate arcuate rack device for the purpose of, as stated, to maintain horizontal orientation of the seat whatever the saddle holder position may be. U.S. Pat. No. 3,861,740 to Tajima, Yasuda, and Seki, 1-21-75, shows a telescoping hydraulic oil cylinder apparatus for vertical seat adjustment capabilities.

These references require separate and different unidirectional seat movement effectuating steps in order to realize a multi-directional seat position change end result. Taken either singly, or in combination, these references do not appear to suggest, anticipate, or teach towards what this invention can embody, namely, an apparatus enabling a combined multi-directional seat position changing capability, within a plurality of releasably locked positions, particularly with regards to its comprising an exclusively single common releasable locking mechanism, connected by cable to a handlebar mounted exclusively single common actuating control, controllable by the rider while riding or the operator while operating. This way the rider, or operator, has but one, identically repeatable, controlling actuation to contend with which enables desirable multi-directional seat position changes to be effected, the need for, and utility of which, follow.

In recent years, intense focus has been placed on aerodynamic efficiency in cycling, particularly as regards rider positioning on the bicycle, which has been proven to be the most significant wind resistance factor. The invention of the aero-type handlebars by Lennon, U.S. Pat. No. 4,750,754, 6-14-88, have been impactful in promoting rider aerodynamic efficiency. Their implementation has brought into sharp focus what the applicant believes has always been, albeit in the past not clearly understood, a long felt but unsolved need in cycling. That unsolved need is how to better reconcile aerodynamic efficiency with biomechanical efficiency. Biomechanical efficiency will be defined as whatever would tend to promote, irrespective of wind resistance, going faster and further, per calorie of energy expended, with the most comfort possible. In general, concerning body positioning on traditionally designed bicycles, it has always been that to get better aerodynamic efficiency some biomechanical efficiency would have to be sacrificed, and vice-versa. Conventional and traditional bike design provides for the most optimal biomechanically efficient position to be where the rider is seated relatively upright, arms only slightly bent, with the hands on the handlebar tops or hoods, upper-body-to-legs angle being relatively open, permitting full breathing and blood flow, the greater percentage of body weight on the seat, and muscles working around a midrange between full extension and full contraction. This is fine while riding in a pack where wind resistance is minimized, and is the position most seen being used by riders in a pack. However, in solo or small group breakaways, or even in large group speed increases, where wind resistance becomes the dominant speed limiting factor, the riders will move their hands onto the handlebar drops and assume as low and horizontal a back position as is possible. This position throws more upper body weight onto now tensed supporting tricep muscles, compresses the upper-body-to-legs angle, which constricts breathing and blood flow, and forces muscles, particularly the gluteous maximus, to work in a less efficient over-stretched position. It is common in cycling to see riders move forward on their seats in this position which expands the upper-body-to-legs angle somewhat, offering some relief from the above mentioned constrictions and overstretching, but at the same time shortening, rider sensibly, the pedal-to-rider's-rump distance. These are the prices that have always had to be paid for minimizing the even greater performance limiting factor of wind resistance.

These problems are now beginning to be recognized and dealt with, particularly in the realm of triathlon racing where aerodynamics are so important that aerobars have come into universal use, but yet where biomechanical drawbacks in assuming this low horizontal back position still present an unsolved problem. While statically relocating a bicycle seat even further forward than conventional adjustment would allow, in order to provide that better biomechanically efficient position of expanding the upper-body-to-legs angle, there are times in a race, specifically when climbing hills, where aerodynamic concerns are minimized and where the conventional, body more upright, seat-back position is desirable. So, while working towards solving one problem, a new one is concurrently created.

Some leading athletes and bicycle designers are speaking about these issues. In the August, 1989 issue of "Bicycle Guide" magazine, in an article entitled, "Power Without Pretense", page 43, center column, author Christopher Koch, in a discussion concerning the use of aerobars, including observations from Mike Pigg and Mark Allen, two of the world's top triathletes, says, "The strange ski tuck is de rigueur. Indeed, both Pigg and Allen now train and race full time on Profile aerobars. But, when they first tried the new position, they were as uncomfortable as they looked." "The new position was really hard on my back ", says Pigg, "because you're working in a really laid-out position, and the back is just not used to it. It puts more weight on your shoulders because you're laying out there, whereas with a normal position you're sitting more on your butt. The hamstrings and butt muscles are also stretched to the limit," adds Pigg. "The butt and hamstrings all had to adapt because they're all connected to the back," he says. "You're in a little more pain than normal. I could do 25 miles ( in the new position ) pretty easily at first, but when you get to the 50 to 100 mile races (the pain) starts to add up. So it took me about six months to get used to it." "According to Allen, those not blessed with adequate flexibility may never get used to the bars." "A lot of riders don't loosen up enough to stay way down," he says. "That's why you'll see their stems way up high and the bars tilted up so essentially they're sitting up higher than they would have been on regular bars." "Perhaps the biggest change resulting from the new bars has been the change in the rider's orientation to the pedals and the front end of the bike." "Last year I rode with my seat in the old (pre-profile bars) position and was really uncomfortable," Allen says. "And it finally dawned on me near the end of the season that I needed to start moving things forward." (End quote)

The applicant, having competed in triathlons, encountered the same problem and had the seatpost, itself, bent forward at a local muffler shop to obtain that further forward seat positioning which the limits of the conventional horizontal seat adjustment capability did not allow.

This issue has prompted bicycle frame designers to put their skill and expertise to use. In the same above mentioned magazine, in an article entitled, "Road Test; Desert Princess & Quintana Roo Superform", in discussing a new radical bicycle frame design, author Doug Roosa, page 48, 3rd column, says, "Ralph Ray, Marti's husband, reveals the idea behind the Desert Princess:" "We said to heck with biomechanics and let's optimize aerodynamics." "Like most triathletes, Marti is a dedicated aerobar user, and Ralph felt her regular racing bike did not complement the bars. Marti was having trouble holding a full aero tuck, and the heavy weight bias that the aero riding position puts on the front wheel was compromising handling. So Ralph played "what if". What if I position Marti so she can ride with her torso truly flat and do so comfortably? What if I rejigger the wheelbase of the bike so that I recapture the balanced weight distribution that makes regular bikes so easy to handle? He sketched out an ideal aerodynamic position for Marti and then penciled in a bike beneath her that included all the tricks that help any rider go fast, including a 24" front wheel with 24 bladed spokes, a 26" rear disk, and Scott 100 K handlebars." (End quote)

Moving forward in the same article to page 49, 3rd column, an enlightening discussion of another bicycle design addressing the same issue, says, "The Superform, like the Desert Princess, is a bike conceived by and built for the triathlete. As such, it is meant to be ridden with Scott handlebars or one of their derivatives. The Superform follows the same format as the Desert Princess with a steepened seat angle, a stretched front and a compressed rear, but its radical presentation is more subtly cast in conventional frame construction. Next to the Desert Princess, the Superform looks positively pedestrian. Dan Empfield, president of Quintana Roo, a company that specializes in products for the triathlete, is not shy about how he got the idea for his bike." "We observed how people rode (with Scott bars) and saw that everyone was riding way forward on their saddle," he says. "We decided there must be some aerodynamic or biomechanical advantage to do so, or why else would guys like Mike Pigg want to put up with the nose of the saddle jamming into their rear end?" "It's actually not uncommon for a racing cyclist to spend time on the tip of the saddle, as anyone who has watched track pursuiters and sprinters can attest. But the problem seemed to be particularly pervasive in triathlons, where competitors are always going full out. Several inventors had begun to address the problem with ideas like add-on saddle extensions, while some athletes took the matter in their own hands and turned their seat posts around to gain forward extension." (End quote)

However, while these changes get the seat forward and allow for improved biomechanical efficiency in conjunction with the use of the aerobar position, they are very specificfunction oriented and present some downsides, as alluded to by Mark Allen in the same magazine, page 43, 3rd column, "Yet there is a downside to triathlon's increasingly radical seat positions" says Allen. "Most of the events we ride have hills, so I found that when I moved too far forward, I lost power in the climbs. I also found that I was putting too much of my weight over the front end, and in terms of handling, it's not an advantage at all." "Allen says that he hopes to experiment with the steeper seat angles that are now in vogue, in order to minimize the handling problem. By steepening seat angles and lengthening top tubes and front centers, triathletes can move forward without sacrificing handling." (End quote)

Ray Browning, another distinguished triathlete, comments on the same issue in the same magazine, page 50, 3rd column, saying, "The Superform suits all my needs now, but it may compromise how well you climb. You do sit a lot further forward, which takes some getting used to, because you feel like you're going to fall off the front. Long descents are a little hairy and uncomfortable." "Browning adds that he'd have no qualms about riding the bike in a criterium, but doesn't think that the bike is going to gather much interest in road racing circles." "It's the road-racing mindset mostly," he explains. "It's against a change as radical as this. " "But aerodynamics are less important in pack racing, he concludes, so any trade-off in handling or comfort for aerodynamics may not be appropriate. " (End quote)

Bill Holland, the Desert Princess frame builder, says in the same magazine, page 49, 3rd column, "But I can't help but wonder if there isn't some way to meld the Desert Princess design to the traditional bike for a more useful all-purpose bike. " (End quote)

In the same magazine, in the article entitled, "Road test; Trimble Monocoque, " James Trimble, the bicycle's builder, in discussing the relative tameness of his bike's 72 degree seat angle compared to the much steeper seat angles now in vogue within triathloning circles, on page 61, 1st column, says, "The Monocoque geometry makes sense biomechanically, and I haven't seen any evidence that the other way is an improvement, " he says. "With the other way, you're not as efficient at turning the pedals all around in a circle. The DH bar position is definitely an advantage, but you shouldn't have to sacrifice good position-not when you can adjust the bars and stem on the bike. " (End quote)

So, in summary for this prior art/background section, it is apparent that those athletes and bicycle designers, extraordinarily skilled in their respective arts, have been feverishly working towards solving the aerodynamic/biomechanical efficiency reconciliation problem, and have approached the issue by attempting to provide the ideal "static " body positioning on the bicycle, which, in terms of specific-function cycling requirements, has met with measures of success. However, as regards meeting multi-specificfunction cycling requirements concerning body positioning, these attempts have fallen short and the solution to the problem unattained.

OBJECTS AND ADVANTAGES

Accordingly, there are several objects and advantages of this invention. By providing an apparatus that will enable an advantageous change in the seat position to accomodate a change in the rider's body position, while riding, an effective solution to the long felt but unsolved need of reconciling the mutually antagonistic, but desirable, objectives of realizing both aerodynamic and biomechanical efficiency, particularly within the realm of meeting multi-specific-function cycling requirements, has now been found.

This invention provides the option for the rider, while riding, to quickly and efficiently change the seat position, at will, to accomodate body position changes dictated by the changing demands of the race, or desired by the rider, in racing or recreational riding, in order to help keep the muscles fresher by using them in different positions, which factor, in itself, is considered significant in bettering biomechanical efficiency.

It was found through trial and error experimentation that forward movement alone did not achieve the desired result, but that a certain increase in height of the seat was required to maintain the proper pedal-to-rider's-rump distance. Further, the angle, or forward tilt of the seat, ideally needed to be changed to place the seat in an acceptably comfortable anatomical relationship with the forwardly bent over body, as most triathletes who'se racing position places the upper body horizontal, do. With the seat level when using this body position, more weight is painfully thrown onto the perineal area of the body since the pelvic structure tends to follow the forward rotation of the upper body. To minimize this discomfort, riders will commonly be seen trying to keep their supporting pelvic bone structure in the normal preferred position on the seat, with the result being an accentuatedly hunched over back, constricting the diaphragm and impairing breathing, not to mention the back strain, itself. Yet, the rider can't alleviate this dilemma by statically adjusting the seat's tilt, or angle, before riding in order to accomodate this position, without incurring the problem of the seat's forward tilt being inappropriate when returning to the substantially upright position, where then an inordinate percentage of upper body weight is maintained on the arms, which have to exert a counterbalancing force to keep the rider's rump from sliding down the tilted seat, unnecessarily tiring the arms and wasting energy, not to mention the discomfort. This invention substantially solves this problem with its variable seat position selectability.

There is another alleged advantage of a forwardly tilted seat concerning the backward thrust of the rider's rump when pedalling hard, which a forwardly tilted seat tends to counterbalance. This backward thrust phenomenon was interestingly approached by a cycling team that used guy wires for counterbalancing, as shown and described in the February, 1988 issue of "Bicycling" magazine, page 48, 3rd column. Another device, apparently designed to prevent rearwards rump sliding is shown in the August/September, 1989, Broward/Palm Beach edition, of "Florida Sports" magazine on page 5. The applicant's invention, with seat angling being part of its multi-directional seat positioning capabilities, may help solve this alleged problem, as well.

So, after blending this multi-modal, or three plane movement, assemblage into a satisfactory combination for the purposes intended, the inherent design conflict expected, concerning variances in rider sizes, was found to be, allfactors considered, effectively insignificant. So, with the supporting structure part of the apparatus satisfactorily designed, an exclusively single common releasable locking mechanism was designed to serve the intermittent locking requirements for the range of movement capability of the supporting structure. Then, an exclusively single common actuating control was designed for the rider to be able to activate, in an identically repeatable manner, in order to control the movement of the seat. With the seat spring biased to move in a generally forward direction, it will move that way when the rider unweights the seat and activates the control, and will move back towards the rear when the control is activated and the rider rearwardly weights the seat, easily overcoming the generally forward spring tension. All this, of course, is explained in detail further on.

At this point, a definition of the terms "supporting structure", "releasable locking mechanism", and "actuating control" is in order, since, these terms are used in the specification, claims, and abstract, and together comprise the "apparatus", which is the invention. "Supporting structure" is defined as that assemblage of componentry whose primary purpose is to provide support between rider and bicycle, and to enable seat movement to and from various different positions available. "Releasable locking mechanism" is defined as that assemblage of componentry whose primary purpose is to release and lock "supporting structure" movement capability. "Actuating control" is defined as that assemblage of componentry whose primary purpose is to activate the "releasable locking mechanism" to unlock. Because of interconnectional intimacy there are overlaps in structure and function, particularly between the "supporting structure" and the "releasable locking mechanism", but as nearly as can be isolatedly differentiated, it is hoped these definitions assure clarity.

It is believed the new and unexpected results of this invention will become even more significant when clip-on type aerobars are allowed in road racing, which appears likely to occur because of their growing desirability in general cycling circles, and because they still allow the use of the conventional handlebars with their better stability and handling characteristics. And, with the usually more frequent need for body position changes in road racing versus triathlon racing, it is believed this invention will become standard equipment.

Standard static, or pre-cycling, conventional adjustment capabilities are retained with this invention, since, the supporting structures of the submitted embodiments are constructed to fit a conventional seat post clamp. This advantage opens up a broad range of possibilities for variations in the "while cycling" end result locations of the differing seat positions. The supporting structure could be modified or altered for use with a specially designed seat post/clamp assembly for reasons of providing even further seat position options, weight reduction, strength increases, etc.. The apparatus is intended to be as light in weight as possible while maintaining adequate strength and reliability, ideally adding little or no weight to the bicycle, which may be possible because of substituting strong lightweight metal alloys for the standard steel seat support rails and various apparatus componentry. One embodiment shows the apparatus clamped to both a standard seat post clamp and a standard seat support rail assembly, permitting the use of a standard over-the-counter purchased seat. This arrangement would, of course, necessarily add net weight to the bicycle.

The aesthetic appearance of this invention is considered to be important, and efforts have and will be made to enhance its aesthetic attractiveness.

A new added dimension of racing realism, by using this invention in the stationary cycle-type machine exercising field, can be enjoyed, where the variety of its objects and advantages can provide new stimulating simulation of the exciting and novel seat/body position changing options it benefits actual road cycle racing with. This invention can also be suitable for use with tricycle-type cycle machines.

Further objects and advantages of this invention will become apparent from a consideration of the drawings and ensuing descriptions of it.

BRIEF DESCRIPTION OF THE DRAWING FIGURES AS THEY RELATE TO VARIOUS EMBODIMENTS

Preferred Embodiment FIGS. 1-8

FIG. 4 is a rear view indicated by view bracket 4 in FIG. 2.

FIG. 5 is a front view indicated by view bracket 5 in FIG. 2.

FIG. 6 is a top view indicated by view bracket 6 in FIG. 2.

FIG. 7 is a top view indicated by view bracket 7 in FIG. 3.

Alternate Embodiment FIGS. 9-17

FIG. 9 is a perspective view of a supporting structure in position one and part of a releasable locking mechanism.

FIG. 10 is an underside view indicated by view bracket 10 in FIG. 9.

Figure 11:
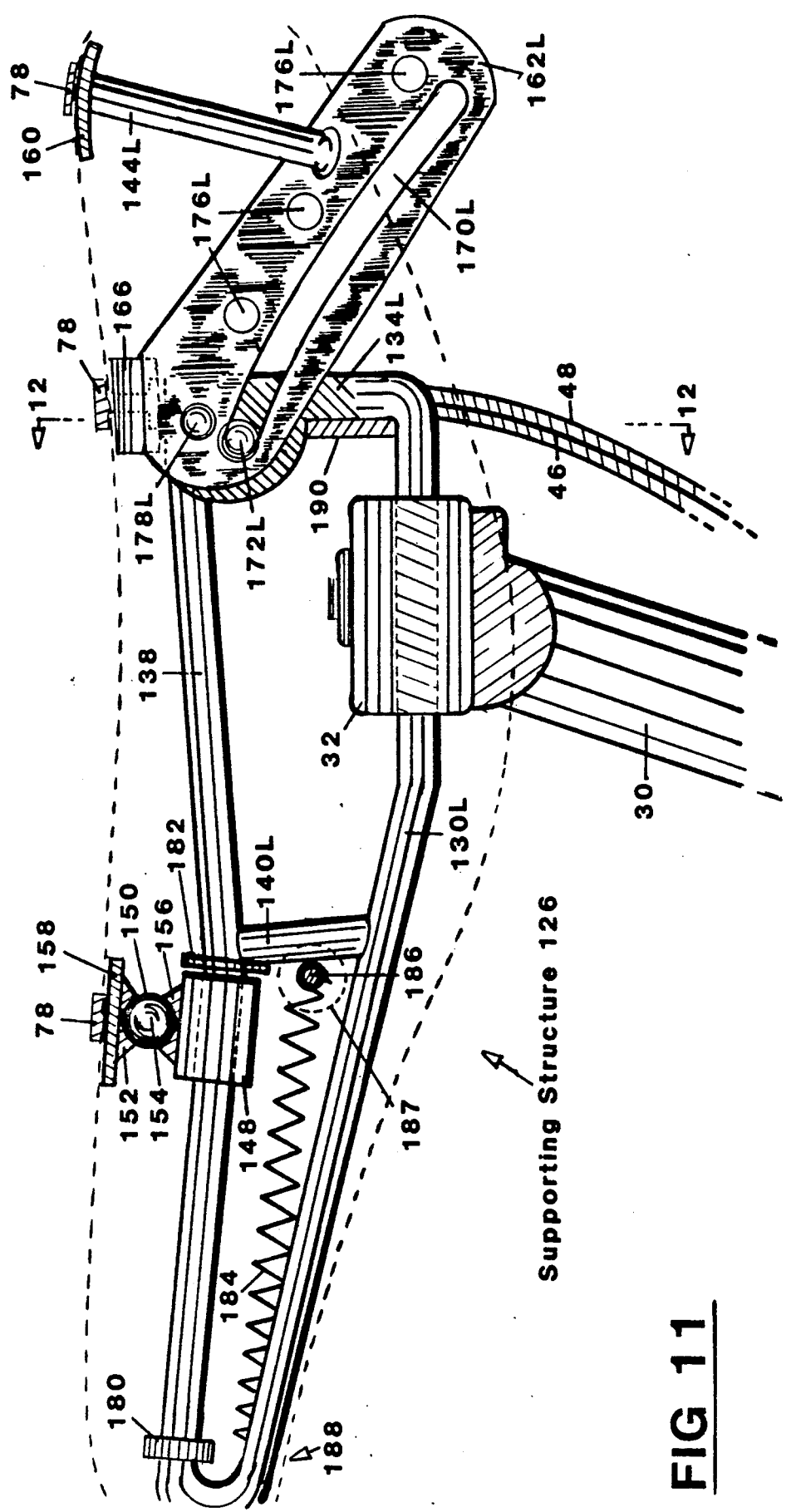

FIG. 11 is a left side elevational view of the supporting structure in position one and part of the releasable locking mechanism.

Figure 12:
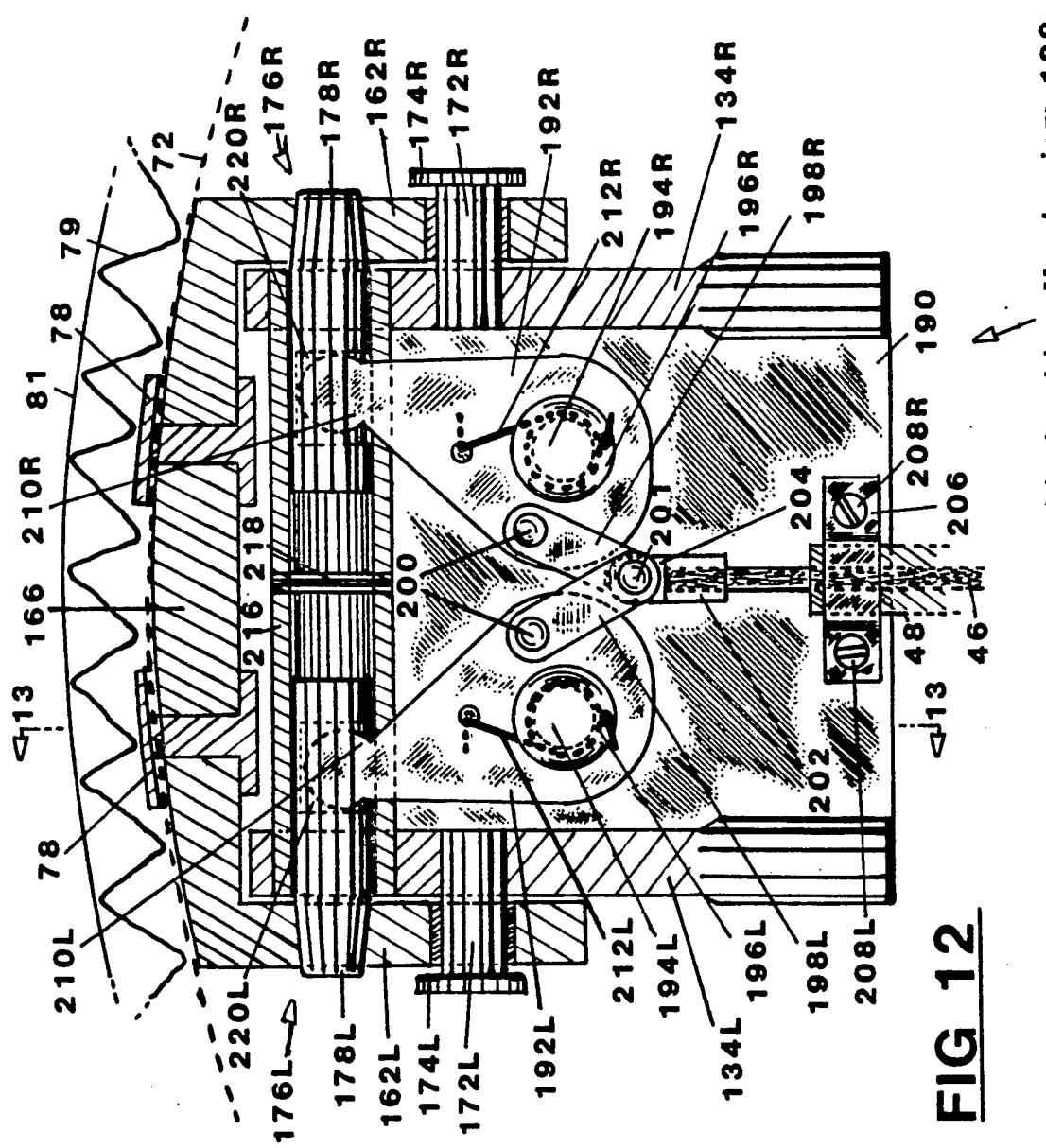

FIG. 12 is a partially cross-sectioned view of the releasable locking mechanism taken on line 12—12 in FIG. 11.

Figure 13:
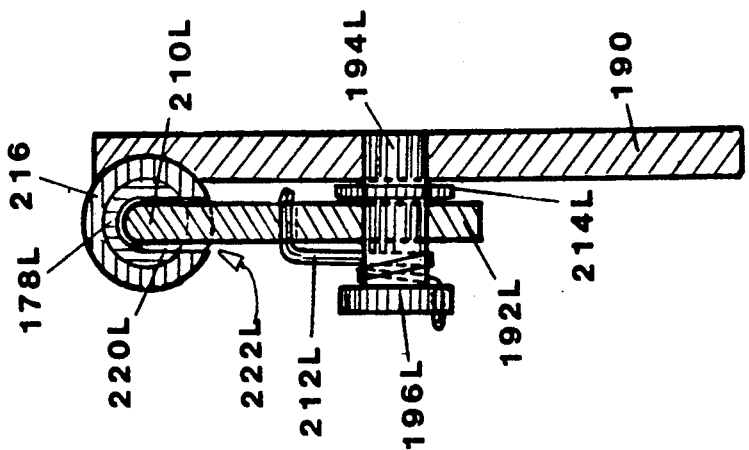

FIG. 13 is a partially cross-sectioned view of a portion of the releasable locking mechanism taken on line 13—13 in FIG. 12.

FIGS. 14–17 depict seat positions 1–4, respectively.

Alternate Embodiment FIGS. 18–21

FIG. 18 is a left side elevational view of a supporting structure in rearward position and a releasable locking mechanism.

FIG. 19 is an underside view indicated by view bracket 19 in FIG. 20.

FIG. 20 is a left side elevational view of the supporting structure in frontward position and the releasable locking in mechanism.

FIG. 21 is a cross-sectional view taken on line 21—21 in FIG. 20.

Figure 22:
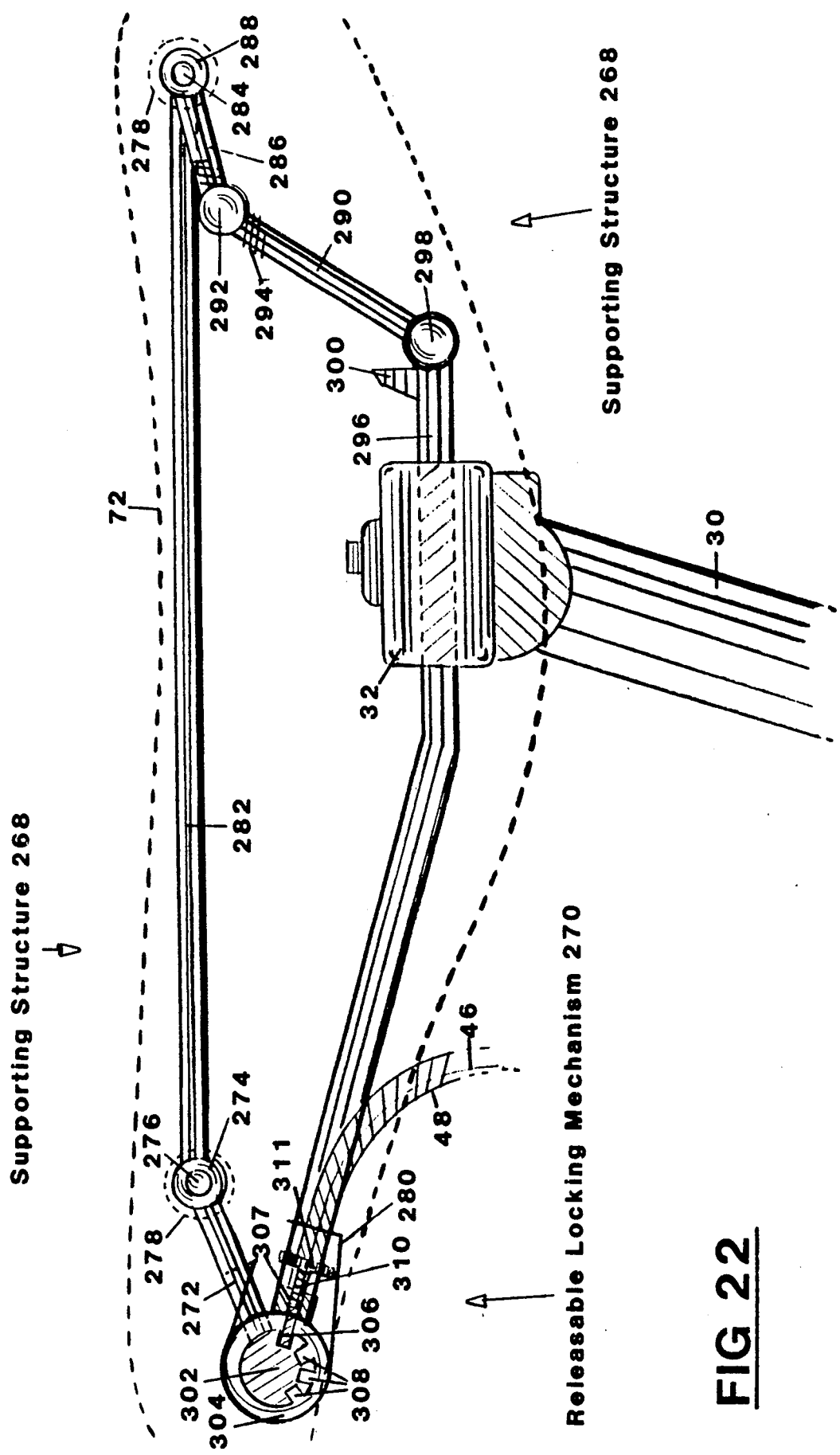

Alternate embodiment FIG. 22

FIG. 22 is a left side elevational view of a supporting structure in position one and a releasable locking mechanism.

Figure 23:
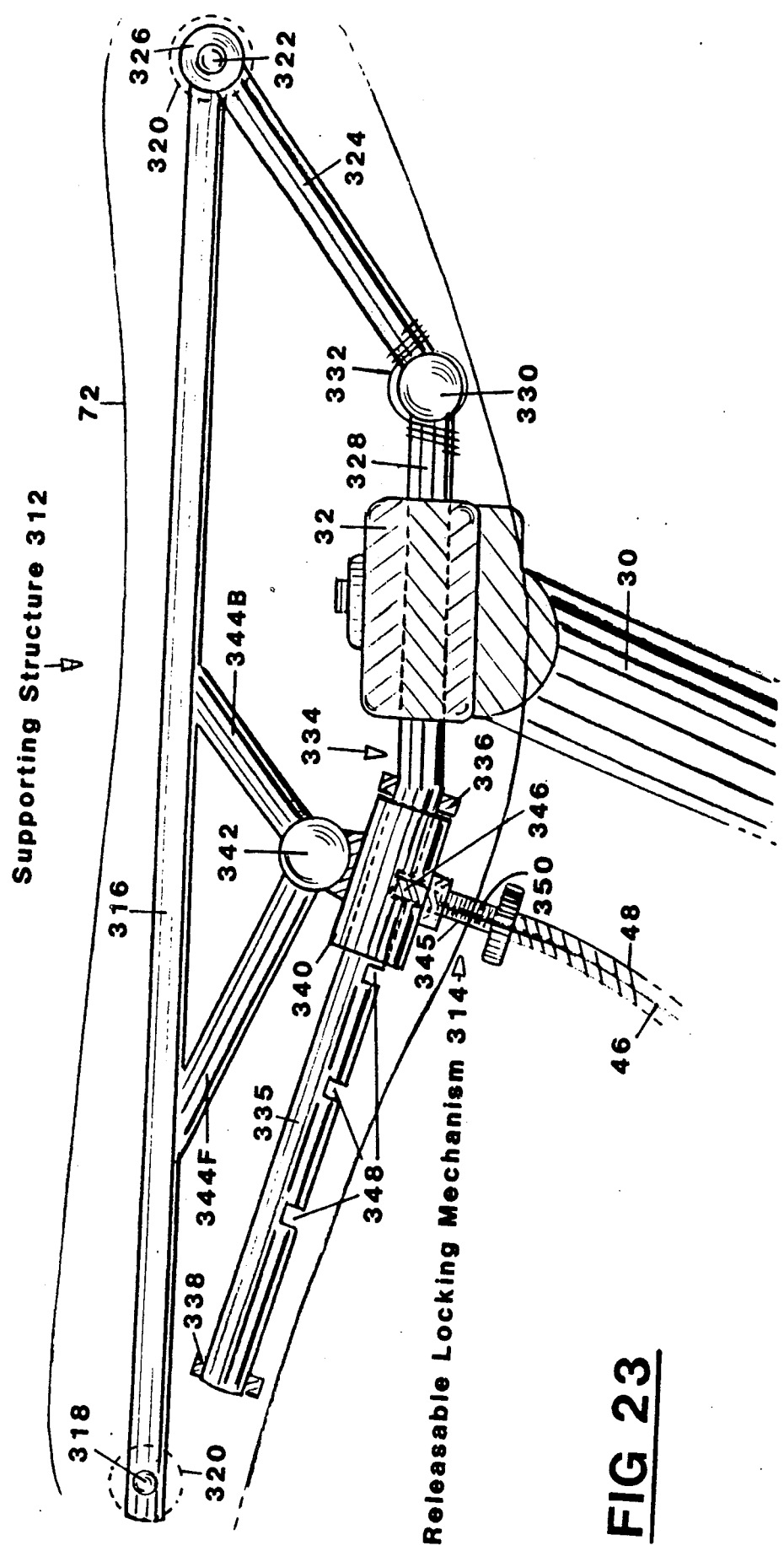

Alternate Embodiment FIG. 23

FIG. 23 is a left side elevational view of a supporting structure in position one and a releasable locking mechanism.

Figure 24:
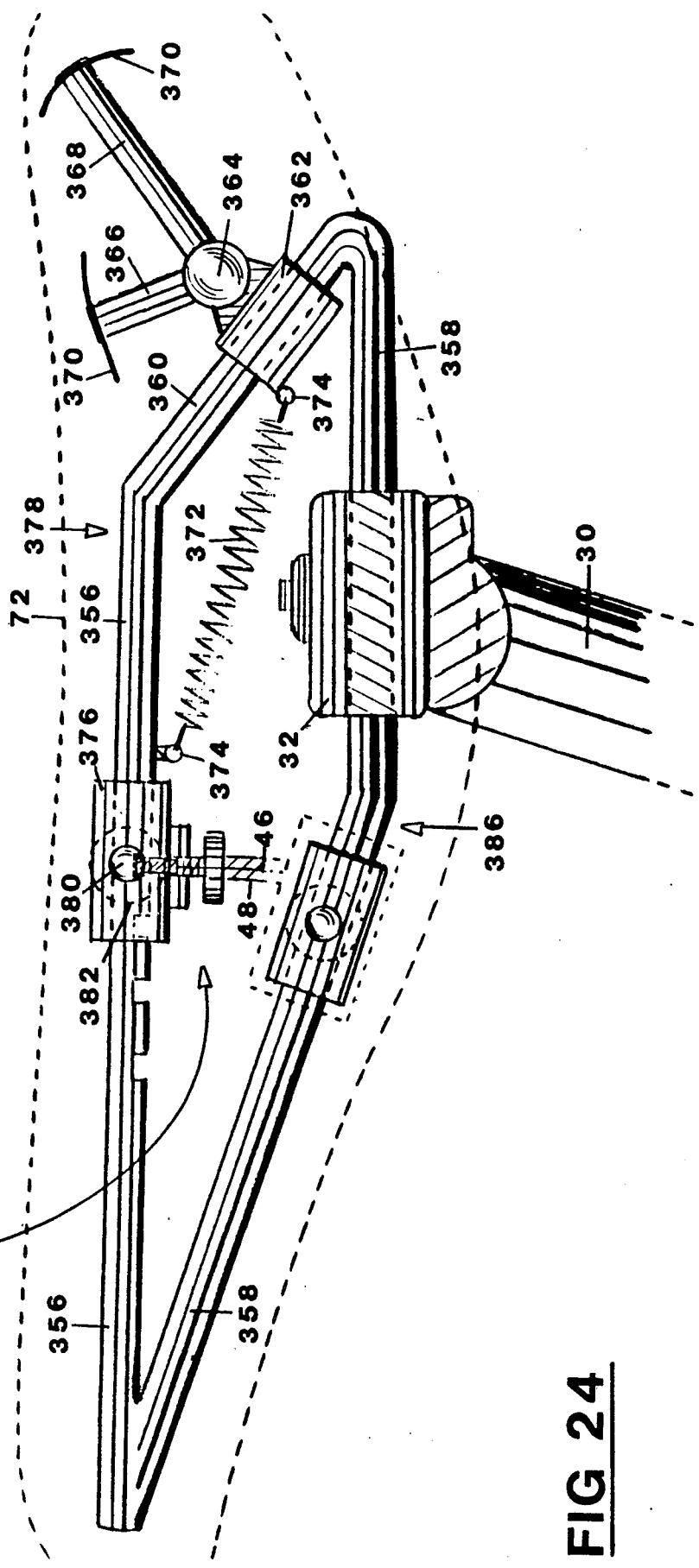

Alternate Embodiment FIG. 24

FIG. 24 is a left side elevational view of a supporting structure in position one and a releasable locking mechanism.

Figure 25:
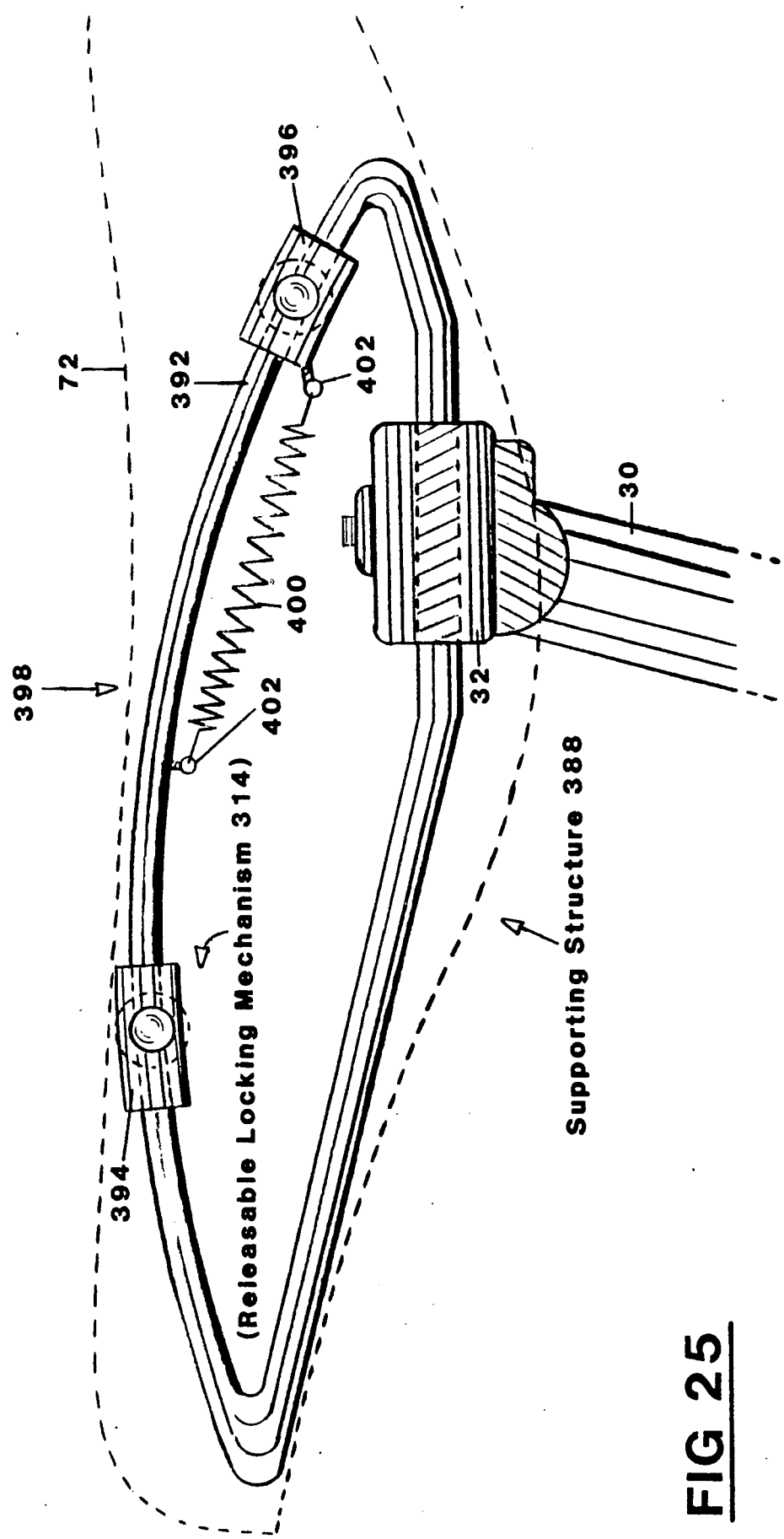

Alternate Embodiment FIG. 25

FIG. 25 is a left side elevational view of a supporting structure.

Figure 26:
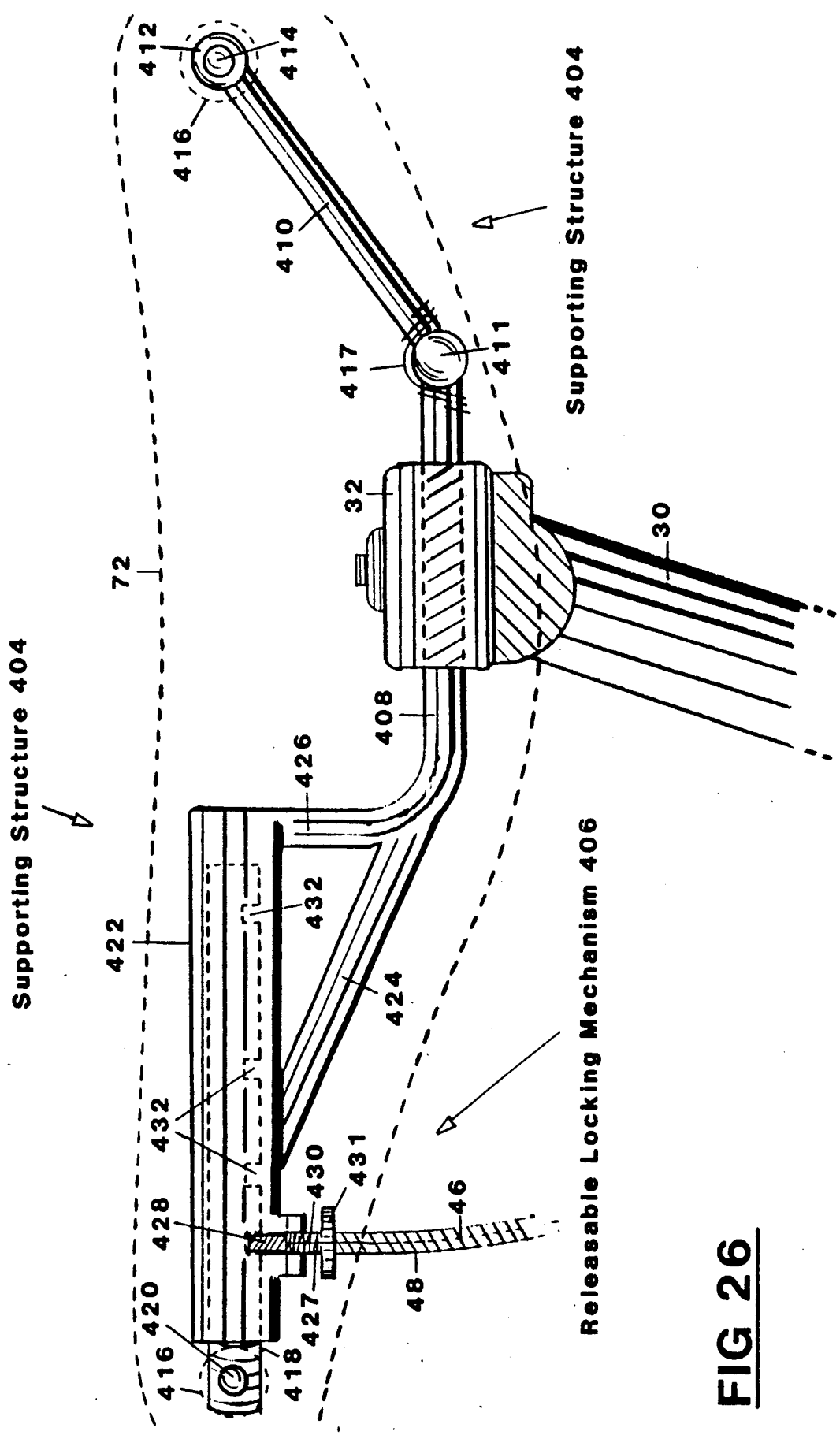

Alternate Embodiment FIG. 26

FIG. 26 is a left side elevational view of a supporting structure in position one and a releasable locking mechanism.

Figures 27, 28:
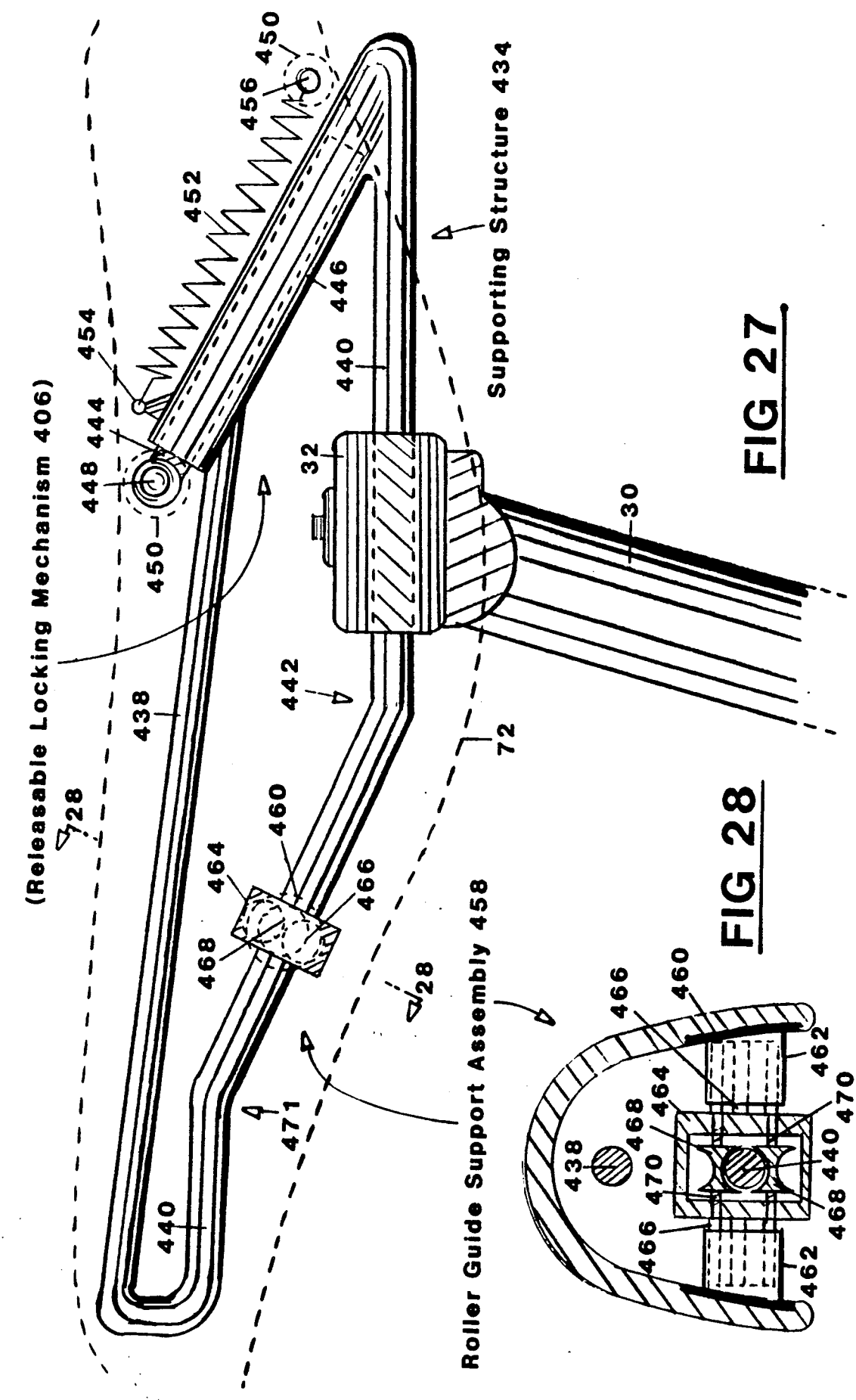

Alternate Embodiment FIG. 27

FIG. 27 is a left side elevational view of a supporting structure.

FIG. 28 is a cross-sectional view taken on line 28—28 in FIG. 27.

DESCRIPTION OF INVENTION

Structural Description of Preferred Embodiment FIGS. 1-8

Figure 1:
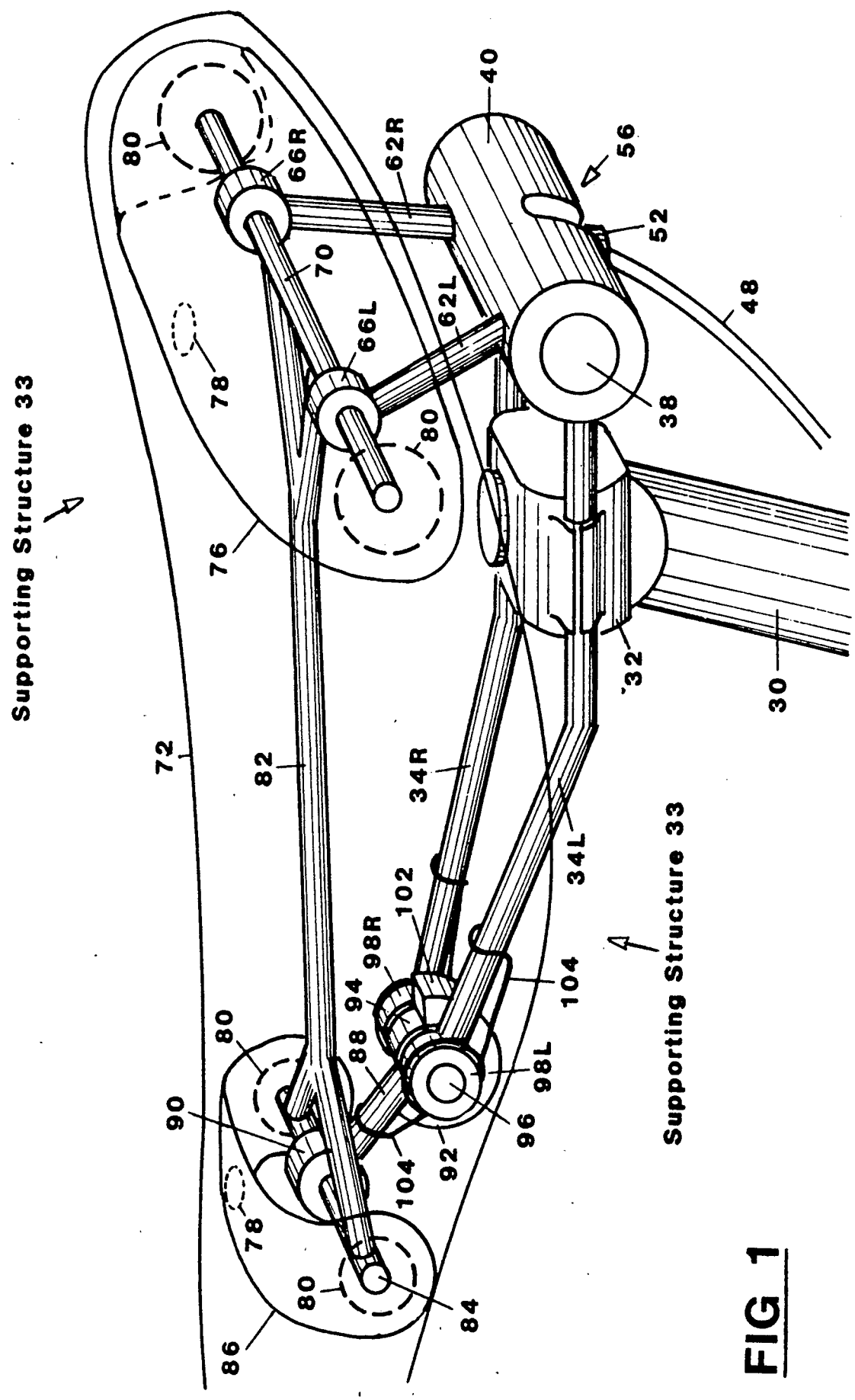
FIG. 1 is a perspective view of a supporting structure in a frontward position.
Figure 2:
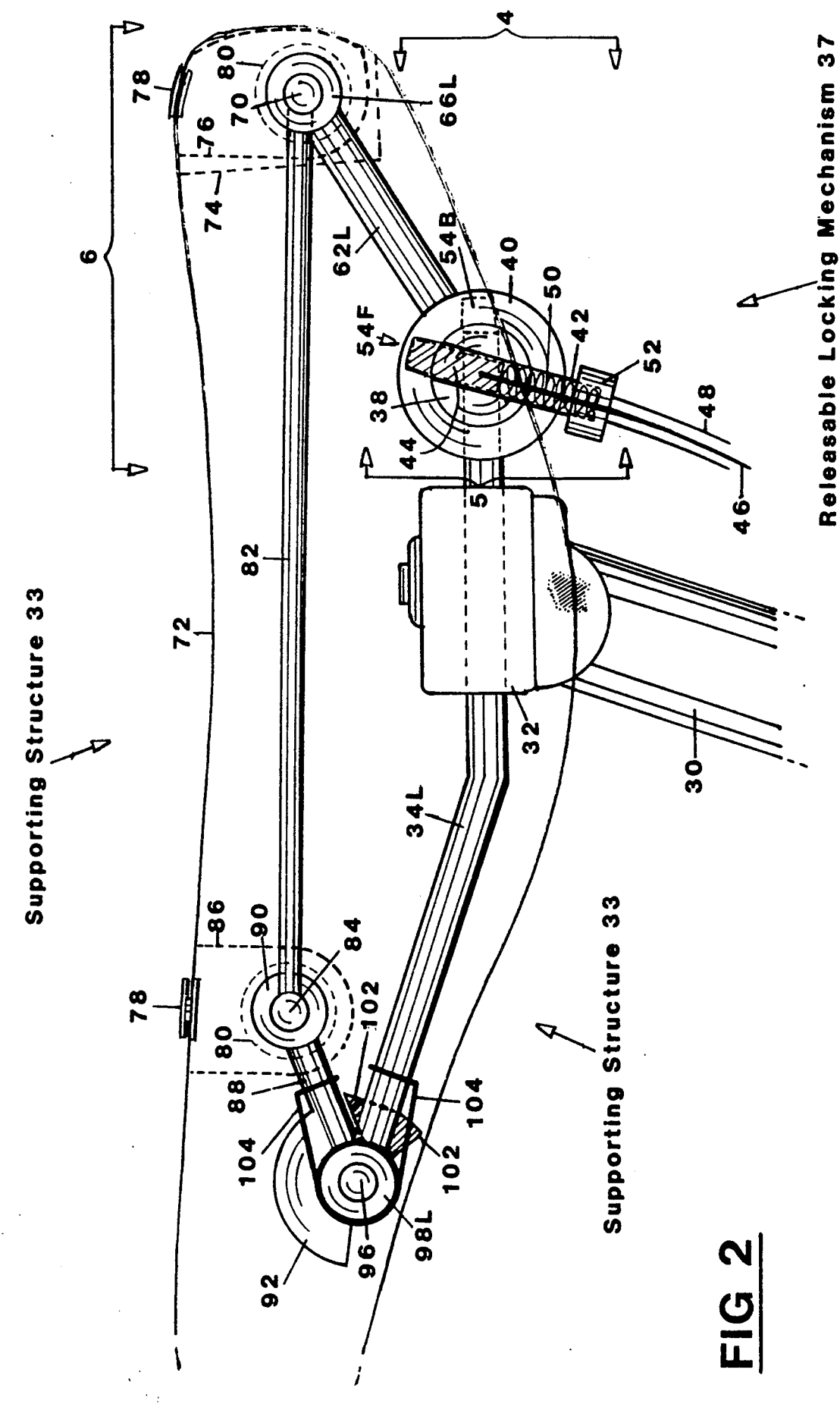
FIG. 2 is a left side elevational view of the supporting structure in rearward position and a releasable locking mechanism.
Figure 3:
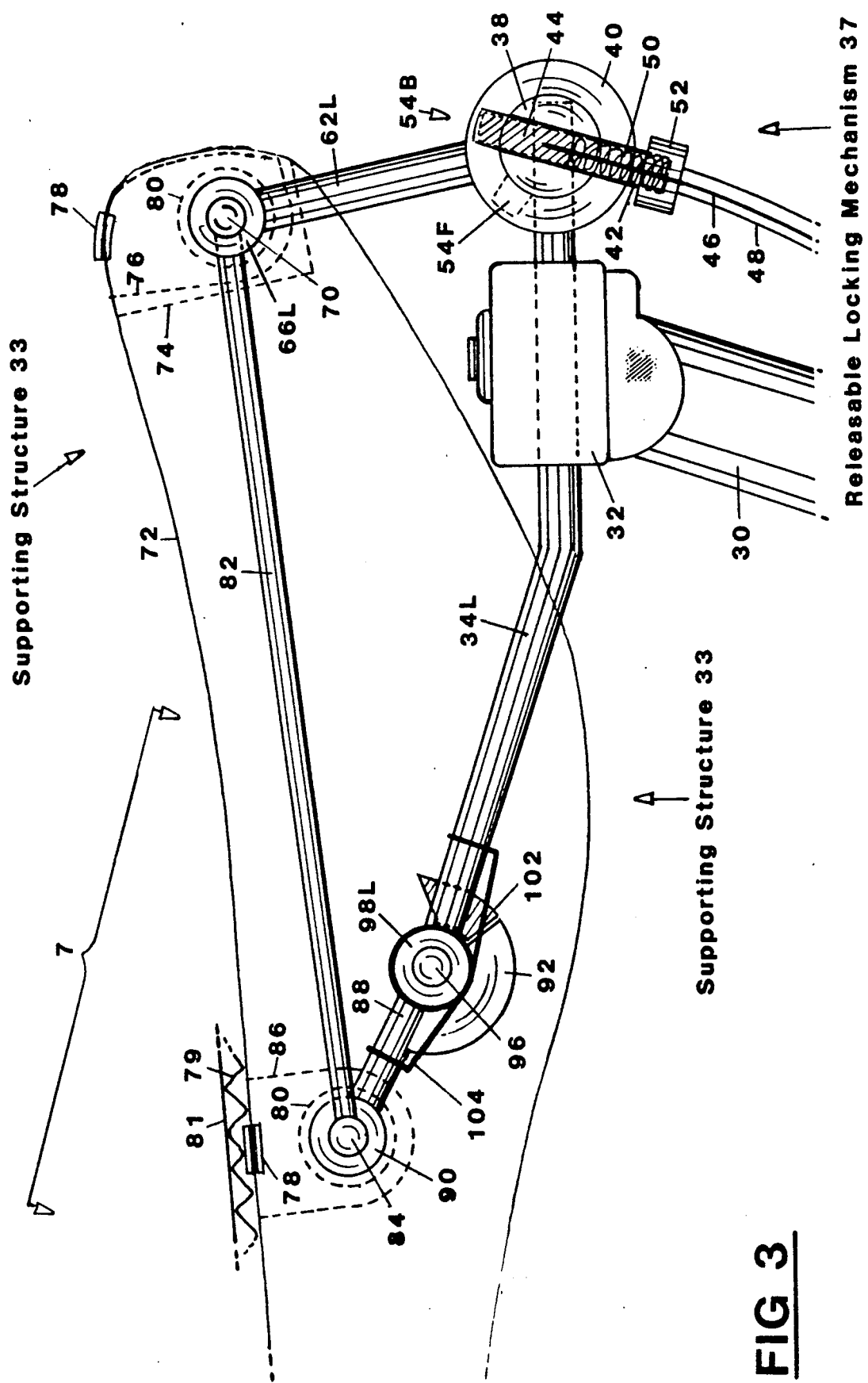
FIG. 3 is a left side elevational view of the supporting structure in forward position and the releasable locking mechanism.

FIG. 1 shows a conventional seat post 30 and a seat clamp 32 to which a supporting structure 33 is secured. A bottom bar 34R and a bottom bar 34L exit clamp 32 and extend forward, being integrally affixed with, or welded to, a right bottom bar end piece 98R and a left bottom bar end piece 98L, respectively, both of which are transversely bored to receive a connecting fixed dowel 96, secured by an adhesively supplemented press fit. FIG. 7 gives a top view of this connectional relationship. In FIGS. 1,2,3,and 7 a front swing arm 88, integrally comprising an upper end segment 90, a lower end segment 94, and an arcuate shoulder segment 92 is shown, with lower end segment 94 being transversely bored to rotatably engage around dowel 96, in between end pieces 98R and 98L. A front swing arm stop 102 is weldedly affixed between bottom bars 34R and 34L, leaving clearance for end segment 94 to be able to rotate freely about dowel 96, and providing a top surface angle to matchingly receive the corresponding bearing surface of arm 88 (FIG. 2), and providing a bottom surface angle to matchingly receive the corresponding bearing surface of shoulder segment 92 ( FIG. 3). Upper end segment 90 is transversely bored for rotatable engagement around a front seat-shell-attached anchor shaft 84. A front metal reinforcing piece 86 is conformedly attached by adhesive and a rivet 78 to the inside nose area of a seat shell 72. A hole is bored through either side of piece 86 and seat shell 72 to allow shaft 84 to snugly pass through and project outwards from seat shell 72 on either side enough to allow an anchor flange 80 to fit snugly flush, therewith, on either side. Flange 80 is attached to shaft 84 and seat shell 72 by adhesive on either side of seat shell 72. A tension rod 82 is "Y" configured at the front with each projecting branch being weldedly attached to anchor shaft 84 next to either inside surface of piece 86, best shown in FIG. 7. The various welding and adhering operation sequences referred to in the description can be varied to best logically suit skilled artisan construction. For example, stop 102 can be welded in place before dowel 96 is adhesively pressed into place in order to prevent impairing the adhesive bond with the high heat of welding, just as tension rod 82 can be welded to anchor shaft 84 before seat shell 72, with reinforcing piece 86 already riveted and adhered in place, with holes already bored, is spread apart enough to be installed over and engaged with the ends of shaft 84, where then flange 80 can be adhered in place on either end of shaft 84. A seat movement spring 104 is installed as shown in FIGS. 1,2,3, and 7 to urge counterclockwise rotation, as viewed from the left, of front swing arm 88. Shown in FIGS. 1,2, and 6 an optional rear metal reinforcing piece 76 is conformedly adhered to the inside rear portion of seat shell 72. In FIGS. 2 and 6 a molded plastic support 74 is conformedly adhered to reinforcing piece 76. With reinforcing piece 76 not being used, plastic support 74 would be conformedly adhered to the inside rear portion of seat shell 72. Holes are transversely bored through seat shell 72, piece 76, and support 74 on either side to snugly accept insertion of a rear seat-shell-attached anchor shaft 70. A right rear swing arm fixed end portion 66R and a left rear swing arm fixed end portion 66L are both transversely bored to be rotatably engagable around shaft 70. Shaft 70 is inserted, from left to right, through shell 72, reinforcing piece 76, plastic support 74, end portion 66L, end portion 66R, plastic support 74, reinforcing piece 76, and shell 72, leaving the ends of shaft 70 protruding out from either side of seat shell 72 enough to be flush with the outside surface of flange 80, which is adhesively secured to both shaft 70 and shell 72 on either end of shaft 70. Shaft 70 is also adhesively secured to shell 72, piece 76, and support 74 on either side, with end portions 66R and 66L remaining rotatably engaged around shaft 70. Tension rod 82 is "Y" configured at its rear with each projecting branch being weldedly attached to shaft 70 at respective approximate locations depicted in FIG. 6. End portions 66R and 66L are integrally affixed with a right rear swing arm 62R and a left rear swing arm 62L, respectively, both of which in turn are weldedly attached to a rotatable drum 40, shown in FIGS. 1-6. Drum 40 is rotatably engaged around a solid fixed cylinder 38, which has been previously mid-height blind endedly bored near either end to accept adhesively supplemented press-fitted insertions of bottom bars 34R and 34L, respectively. Referring to FIGS. 5 and 6, a right bottom bar drum slot 58R and a left bottom bar drum slot 58L are provided in drum 40 to allow access for the unobstructed insertions of bottom bars 34R and 34L, respectively, directly into cylinder 38, to keep drum 40 laterally centered about cylinder 38, and to allow limited rotational range of drum 40. In FIG. 5, and partially in FIG. 6, a sleeve drum slot 56 is shown which provides for unobstructed direct access of a sleeve 42 into cylinder 38, and allows rotational clearance for drum 40. Before assembly with drum 40, a bore was drilled through the width-wise center of cylinder 38, at the approximate degree of angle shown in FIGS. 2 and 3, for later insertion of sleeve 42. With cylinder 38 installed in preslotted drum 40, sleeve 42 is adhesively supplemented press fit into its receiving bore, with the top of sleeve 42 already having been crowned to match the curvature of cylinder 38 so when pressed home its top surface is flush all around with cylinder 38. A boring instrument bit, snugly fitting into sleeve 42 is urged to cut a front locking pin cavity 54F and a back locking pin cavity 54B into drum 40, the locations for both being determined by supporting structure 33 positions shown in FIGS. 2 and 3, respectively. A releasable locking mechanism 37 is generally shown in FIG. 2. A locking pin 44 is slidably engaged within sleeve 42. A cable 46 is securely attached to pin 44 by insertion into a pre-drilled hole in the bottom of pin 44 and silver soldered or otherwise adequately connected. A locking pin coil spring 50 is installed within sleeve 42 and around cable 46. A cable sheath 48 and sleeve cap 52 are slid over cable 46 until cap 52 comes to bear against sleeve 42, to which it is then threadedly connected, having compressed spring 50 sufficiently to urge pin 44 into cavity 54F or cavity 54B. At this point, then, shown in FIG. 3, a conventional seat shell cushioning material 79 can be conventionally installed, and over that can be conventionally installed a conventional coverlet 81. Then, not shown in the drawings, cable sheath 48 is attached along a conventional top tube of a bicycle by plastic clips to the existing brake cable or plastic ties to the top tube, itself, and strung along to make connection with an actuating control 106, shown in FIG. 8. A conventional bicycle handlebar 109 and bicycle stem 111 are shown. An actuating control clamp 108 is used to clamp an actuating control fixed handle 118 to handlebar 109. Handle 118 is integrally affixed with an actuating control fixed tube 116 which is bored to accept slidable engagement of an actuating control sliding tube 114, to which in turn is integrally affixed an actuating control trigger 112. A longitudinal fixed tube slot 113 is provided at the bottom of fixed tube 116 to provide clearance for longitudinal travel of trigger 112. A cable sheath cap 110 is threadedly connected to fixed tube 116. Removal of cap 110 allows removal of trigger 112 and sliding tube 114 from fixed tube 116, since, slot 113 is open ended at the right side of fixed tube 116. With sliding tube 114 removed from fixed tube 116, cable 46 can be fed through a center hole in the otherwise blind ended right side of sliding tube 114, over which an actuating control over-travel coil relief spring 124 can be installed and slid into sliding tube 114 from the openended left side of tube 114. An actuating control cable end collar 120 can then be slid onto cable 46 and partially into accepting sliding tube 114 to snug up against relief spring 124, where then cable 46 is pulled to remove any slack between collar 120 and locking pin 44 (FIG. 2), so that upon tightening of a collar set screw 122, securing cable 46 to collar 120, operation of actuating control 106 is devoid of excessive play.

Operational Description of Preferred Embodiment
FIGS. 1-8

FIG. 2 shows conventional seat post 30, clamp 32, supporting structure 33, and releasable locking mechanism 37. For purposes of simplicity and ease of reading, the word "seat" is going to be frequently used in referring to different positions rather than "supporting structure ", since, the "seat ", being comprised of seat shell 72, seat shell cushioning material 79, and coverlet 81, moves with supporting structure 33, to which it is attached. When clamped into seat clamp 32, bottom bars 34R and 34L, along with fixedly connected components cylinder 38, sleeve 42, cap 52, sheath 48, stop 102, end pieces 98R and 98L , and dowel 96, all remain stationary relative to clamp 32 and seat post 30, regardless of the movement capabilities of the rest of the described componentry.

FIG. 2 shows the seat in rearward position where locking pin 44 is engaged in cavity 54F, effectively locking the seat in position, since drum 40 cannot rotate relative to cylinder 38, which, itself, is fixed to bottom bars 34R and 34L. Arms 62R and 62L are fixed to end portions 66R and 66L, respectively, and to drum 40. Anchor shaft 70, other than being relatively rotationally and slidably transversely engaged within end portions 66R and 66L, is fixed to them. Shaft 70 is also fixed to the seat. Tension rod 82 is fixed to shaft 70 and to front seat-shellattached anchor shaft 84, which in turn is fixed to the seat. Front swing arm upper end segment 90 and lower end segment 94, other than being relatively rotationally and slidably transversely engaged around shaft 84 and fixed dowel 96, respectively, are fixed to them. And, arm 88 is fixed to both segment 90 and segment 94. With dowel 96 fixed to end pieces 98R and 98L, which in turn are fixed to bottom bars 34R and 34L, respectively, the seat is effectively locked in rearward position FIG. 2 shows arm 88 bearing against stop 102. FIG. 5 shows the bottom terminations of drum slots 58R and 58L bearing on the undersides of bars 34R and 34L, respectively,. Ideally, then, these mentioned bearings should coincide with engagement of locking pin 44 into cavity 54F to more evenly distribute load forces throughout supporting structure 33 and releasable locking mechanism 37 than if they did not coincide.

Figure 8:
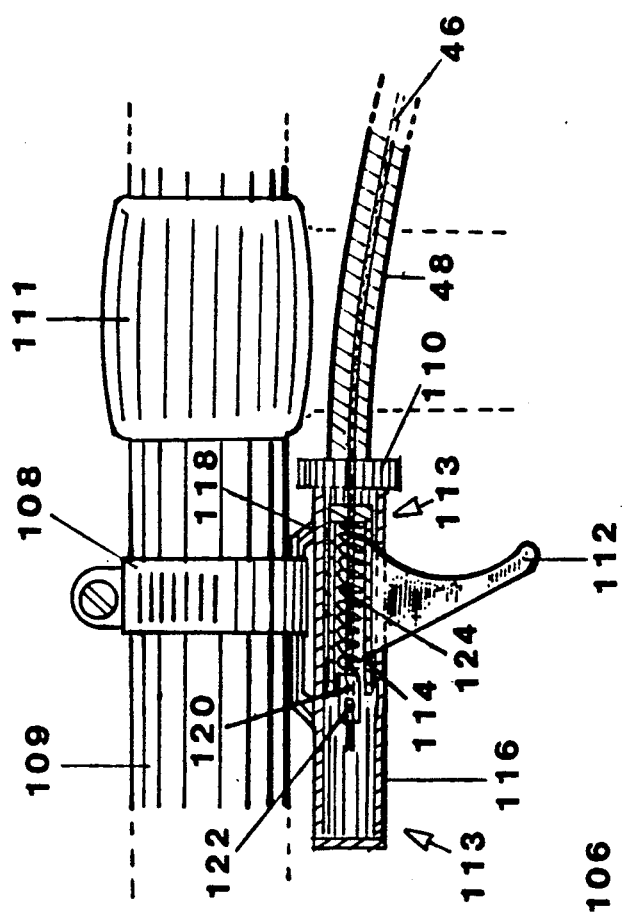
FIG. 8 is a partially cross-sectioned side elevational view of an actuating control.

To change the position of the seat, a rider can, while riding, unweight the seat and activate actuating control 106, shown in FIG. 8. As shown mounted on the left side portion of handlebar 109, the rider can move trigger 112 to the left with the left hand thumb while still keeping the left hand fingers gripping handlebar 109. This activating action then concurrently moves sliding tube 114 to the left, which, in turn moves relief spring 124 to the left, since it bears against the right inside end portion of sliding tube 114. With locking force existing on locking pin 44 from coil spring 50, cable end collar 120, which is presently secured to cable 46, which, itself, is secured at its other end to locking pin 44, resists leftward movement, which is overcome by the push of relief spring 124, which has greater compression resistance than coil spring 50. Thus, locking pin 44 will be pulled from cavity 54F. The purpose of relief spring 124 is to avoid potential actuating control 106 component, releasable locking mechanism 37 component, and cable 46 damage. Should locking pin 44 be pulled far enough to fully compress coil spring 50, relief spring 124 will then begin to compress, preventing sudden over-travel solid-lock shock to the componentry, and thumb, for that matter. Relief spring 124 could be omitted by lengthening collar 120 to bear against the inside right end of tube 114.

With locking pin 44 removed from cavity 54F, drum 40 is free to rotate counterclockwise, which it will do because of the counterclockwise rotational urging of seat movement spring 104 on front swing arm 88, which, as described, is effectively connected to drum 40 through the various supporting structure 33 interconnected componentry. The counterclockwise rotation of arm 88 and drum 40 will continue until arcuate shoulder segment 92 comes to bear against stop 102, shown in FIG. 3. Simultaneously with this bearing contact, the upper terminations of drumslots 58R and 58L come to bear against the upper surfaces of bottom bars 34R and 34L, respectively, as can be ascertained by referring to FIGS. 5 and 6 and visualizing rotation of drum 40 such that the top of drum 40 moves towards the viewer while the bottom of drum 40 moves away from the viewer until the upper terminations of drumslots 58R and 58L move downwards until they contact the upper surfaces of bars 34R and 34L, respectively. Concurrent with these above described bearing contacts, cavity 54B has been rotated into position for accepting entrance of locking pin 44, which will occur with the rider releasing trigger 112, which allows coil spring 50 to push pin 44 into cavity 54B. In practice, the rider will pull trigger 112 and quickly release it, where that brief moment of trigger 112 activation is enough to allow sufficient rotation of drum 40 for released pin 44 to come to bear upon the inside surface of drum 40, between cavities 54F and 54B, where it will slide along until cavity 54B comes into position for it to lock into. Sleeve drum slot 56 serves only to provide rotational clearance for drum 40 around sleeve 42, and its upper and lower terminations never contact sleeve 42. With the seat now in frontward position, the bearing contacts described above serve to both prevent any over travel of the intended range limits of seat movement and to distribute stress loads throughout supporting structure 33 and releasable locking mechanism 37, as the bearing contacts described for rearward seat positioning similarly do.

The seat can be moved back to the rearward position from the frontward position by the rider activating actuating control 106, which releases pin 44 from cavity 54B, freeing the seat to move backwards, which it will do when the rider exerts a backwards push with the rump on the seat, easily overcoming the forward seat movement biasing of seat movement spring 104. With trigger 112 released, pin 44 will find and lock into cavity 54F when the seat is moved back all the way to where front swing arm 88 comes to bear against stop 102, shown in FIG. 2, and the bottom terminations of drumslots 58R and 58L come to bear against bottom bars 34R and 34L, respectively, as shown in FIG. 5.

Structural Description of Alternate Embodiment
FIGS. 8, 9–17

FIG. 9 shows a perspective view of a supporting structure 126, part of a releasable locking mechanism 128, a conventional seat post 30, and seat post clamp 32, with a bottom bar 130R and a bottom bar 130L clamped conventionally in either side of clamp 32. Bottom bars 130R and 130L are joined by welding or brazing with a top bar 138 at the forward nose area of seat shell 72. Bottom bars 130R and 130L incorporate an integral bottom bar upright 134R and 134L, respectively, both having squared-off edges and being essentially flat on their inside and outside surfaces, and broadening out forwardly in their approximate upper halves into plate-like shape in order to be suitable for the mounting of, and interconnection with, other components. An essentiallyflat and rectangular mounting panel 190 is affixed between and attached to the front inside portions of uprights 134R and 134L by welding, brazing, or other suitable means. Top bar 138 branches out into a "Y "

configuration at its rear portion with each branch end being weldedly attached to the forward upper arcuately shaped portions of uprights 134R and 134L, respectively. Top bar 138 traverses unbrokenly continuous in between its described attachment points. A brace bar 140R and 140L are attached to top bar 138 and, respectively, to bottom bars 130R and 130L by welding, brazing, or other suitable means. A forward stop 180 and a rear stop 182 are center-holed disks encircled about and fixed to top bar 138 by welding, brazing, or other suitable means. They can, alternatively, be slidably engaged around top bar 138 and fitted with set screws in order to provide releasably lockable location variability options, the purpose for which will be explained in the operation section. A slider barrel 148 is slidably engaged around top bar 138, and is attached to a bottom hinge wing 156 (seen in FIG. 11) by welding, brazing, or other suitable means. Bottom hinge wing 156 is fixedly attached to a hinge pin 154 by welding, brazing, or other suitable means, with hinge pin 154 being rotatably journaled, on either side of bottom hinge wing 156, within a hinge member 150, which is fixedly part of a top hinge wing 152, with top hinge wing 152 being fixedly attached to a front seat-shell-attached support platform 158 by welding or brazing such that slider barrel 148 is effectively hingedly attached to front seat-shell-attached support platform 158, which in turn is fixedly attached to seat shell 72 with a rivet 78 and adhesive, or other suitable means. A seat movement spring 184 is hooked at its rear extremity to an anchor rod 186, perspectively seen in FIG. 9, which is positioned athwart to the fore & aft plane of seat shell 72, and is tightly engaged within a through-hole on either side of seat shell 72, the ends of rod 186 projecting outwards from either side of seat shell 72 enough for the outside surface of an accepting center-holed flange 187 to be flush, therewith. After installation, flange 187 is spot welded onto either end of rod 186, and is then adhesively secured to both sides of seat shell 72. In FIG. 10, spring 184 is shown hooked to an eyed boss 188, which is located at the junction of top bar 138, bottom bar 130R, and bottom bar 130L.

A rear seat-shell-attached support platform 160 is attached with rivets 78 to the rear upper inside of seat shell 72, with a right support strut 144R and a left support strut 144L, both weldedly attached to platform 160, and both projecting downwards to be weldedly attached to the outside surfaces of a right side plate 162R and a left side plate 162L, respectively. A side plate cross brace 168 is transversely placed between the rear end portions of side plates 162R and 162L and welded to them. Side plate 162R has a right side plate detent hole 176R located at four longitudinally spaced positions. A right side plate guide pin slot 170R is cut into plate 162R. Left plate 162L has a corresponding detent hole 176L and pin slot 170L positionally located the same as in plate 162R such that if plates 162R and 162L were placed together, detent holes 176R and 176L, and slots 170R and 170L would match up. Detent holes 176R and 176L are tapered from wider on the inside to narrower on the outside to matchingly accept insertion of a right detent locking pin 178R and a left detent locking pin 178L, respectively, as shown in FIG. 12. Side plates 162R and 162L are integrally affixed with, or can be welded to, a seat-shell-attached top plate 166, also shown in FIGS. 9 and 11. Top plate 166 is contoured on top to be conformedly fastened to seat shell 72 with adhesive and rivets 78. Conventional seat shell cushioning material 79 and coverlet 81 are adhesively installed over seat shell 72. A right guide pin 172R and a left guide pin 172L are press fit into receiving holes in uprights 134R and 134L, respectively. A right guide pin flange 174R and a left guide pin flange 174L are integrally affixed to guide pins 172R and 172L, respectively. FIG. 12 shows releasable locking mechanism 128. Locking pins 178R and 178L are slidably engaged within tube 216, whose respective end sections are press fit into receiving holes in uprights 134R and 134L. Tube 216 fits lengthwise up against an arcuately matching concaved section of the top backside area of mounting panel 190, and is spot welded to it. A tube center-stop pin 218 is installed in the center of tube 216 by press fit into two receiving holes. A right detent locking pin cavity 220R and a left detent locking pin cavity 220L are cut out of locking pins 178R and 178L, respectively, in order to house a right bellcrank head 210R and a left bellcrank head 210L, respectively. A right tube slot 222R and a left tube slot 222L are longitudinally cut out of the bottom of the right and left sides, respectively, of tube 216 to provide passage clearance for a right bellcrank 192R and a left bellcrank 192L, which are integrally affixed with heads 210R and 210L, respectively, the left side components being shown in FIG. 13. As is seen in FIG. 12, one vertically designated half of releasable locking mechanism 128 is a mirrored image of the other half. Bellcranks 192R and 192L are rotatably installed around a right bellcrank fulcrum pin 194R and a left bellcrank fulcrum pin 194L, respectively, both pins 194R and 194L being press fit into receiving holes in mounting panel 190. A right spacer washer 214R and a left spacer washer 214L are placed between panel 190 and bellcranks 192R and 192L, respectively, to keep bellcranks 192R and 192L square to pins 194R and 194L, respectively, and to keep heads 210R and 210L transversely centered in longitudinal slots 222R and 222L, respectively. A right bellcrank spring 212R and a left bellcrank spring 212L are installed around pins 194R and 194L, respectively, and hooked to a right bellcrank fulcrum pin flange 196R and a left bellcrank fulcrum pin flange 196L, respectively, with the other end of each spring 212R and 212L being hooked to bellcrank 192R and 192L, respectively. Spring 212R biases bellcrank 192R to rotate clockwise, while spring 212L biases bellcrank 192L to rotate counterclockwise. Springs 212R and 212L are configured in such a manner as to also keep bellcranks 192R and 192L, respectively, snugly up against washers 214R and 214L, respectively, to insure aligned non-binding operation of bellcranks 192R and 192L. A right connecting arm 198R and a left connecting arm 198L are hingedly connected to bellcranks 192R and 192L, respectively, by a pivot pin 200, which is inserted through a hole near the end of each connecting arm 198R and 198L, and then press fit into each bellcrank 192R and 192L, respectively. Pivot pin 200 incorporates a flange to retain arms 198R and 198L. Near the other, or bottom, ends of arms 198R and 198L a hole is bored through to loosely accept a rivet pivot pin 201, which, before assembly, comprises two pieces. A cable holdfast flat tang 204 has a hole through it to also loosely accept pin 201. So then, arms 198R, 198L, and flat tang 204 are all loosely engaged around, and hingedly connected together by, pin 201, which is flanged on either end for retainage purposes, and comprises one piece after its two pieces are press fit together. An offset in one of the arms 198R or 198L is required to permit a non-binding overlapping hinged connection of arms 198R and 198L. Flat tang 204 is integrally affixed with a cable holdfast 202. Cable 46 is fixedly attached within a receiving bore of holdfast 202 by silver soldering or other suitable means. Cable sheath 48 is clamped in place to panel 190 by a securing strap 206, which itself is secured to panel 190 by a right screw 208R and a left screw 208L.

Cable sheath 48 runs to connect to actuating control 106, shown in FIG. 8, the structure of which is described in the "Preferred Embodiment A " section.

Operational Description of Alternate Embodiment FIGS. 8, 9–17

For purposes of describing various supporting structure 126 positions, the word "seat " will frequently be used since the "seat " is comprised of seat shell 72, cushioning material 79, and coverlet 81, which are effectively attached to supporting structure 126.

FIGS. 14–17 show the seat in positions 1–4, respectively. When clamped into seat clamp 32, bottom bars 130R and 130L, along with fixedly connected components top bar 138, stops 180 and 182, brace bars 140R and 140L, uprights 134R and 134L, eyed boss 188, mounting panel 190, guide pins 172R and 172L, flanges 174R and 174L, tube 216, stop pin 218, fulcrum pins 194R and 194L, flanges 196R and 196L, strap 206, screws 208R and 208L, and sheath 48 all remain stationary relative to clamp 32 and seat post 30 regardless of the movement capabilities of the rest of the described componentry.

Figure 14:
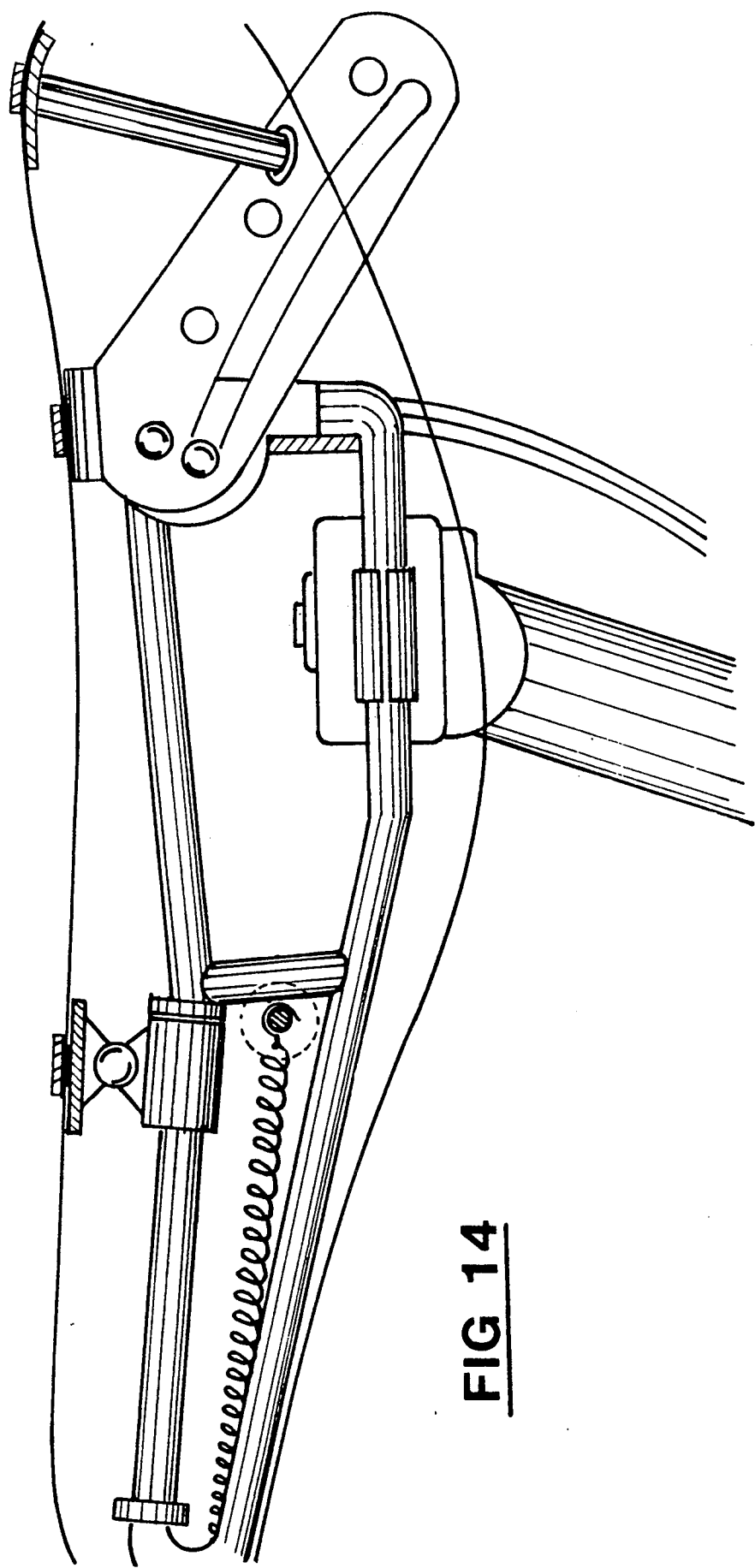
Figure 15:
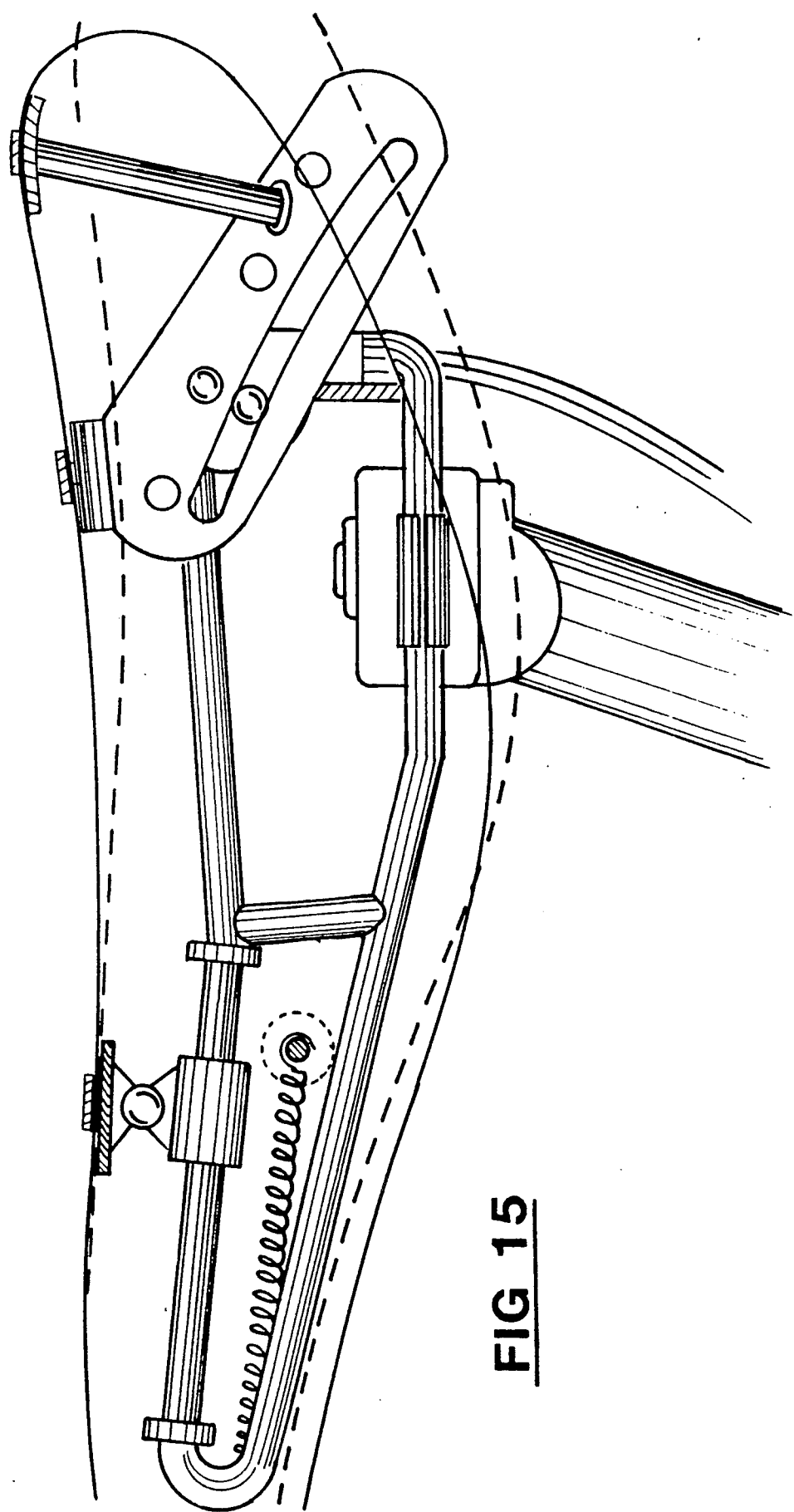
Figure 16:
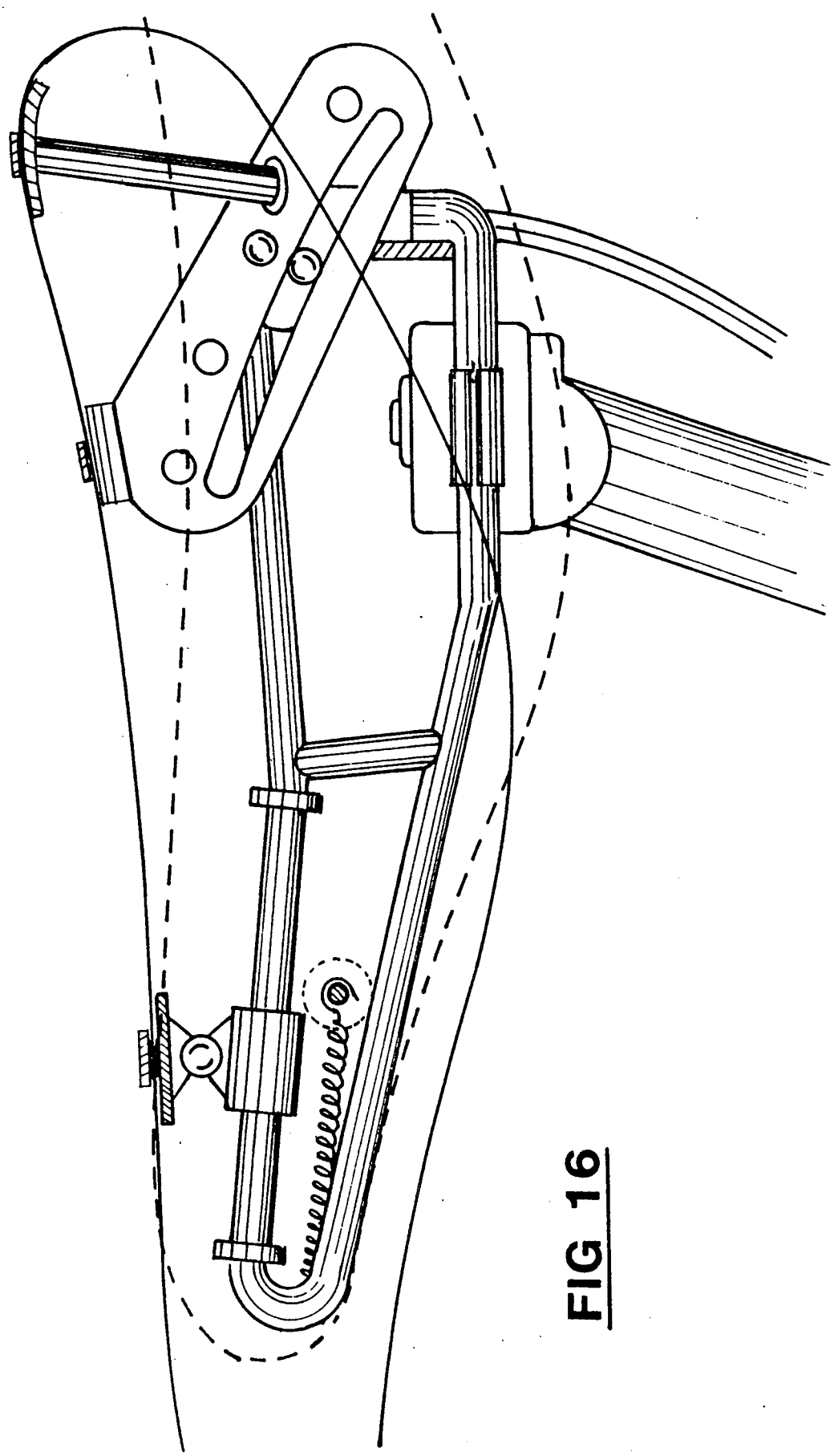
Figure 17:
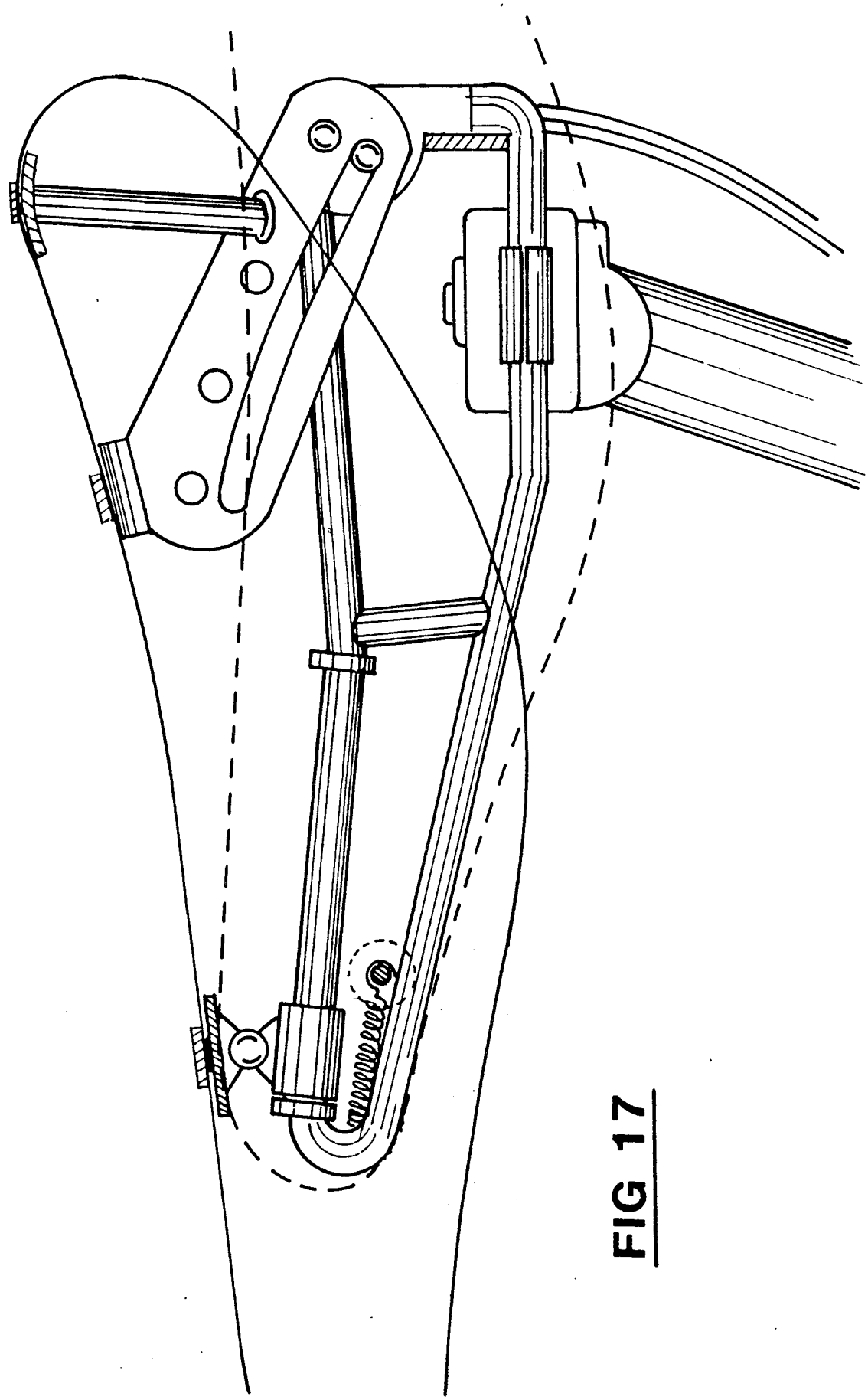

With the seat in position one, shown in FIGS. 9, 11, and 14, locking pins 178R and 178L, both shown in FIG. 12, are engaged in their respective side plate detent holes 176R and 176L, being held in place by bellcrank heads 210R and 210L, respectively, because of the clockwise and counterclockwise biasings of bellcranks 192R and 192L, respectively, by bellcrank springs 212R and 212L, respectively.

When desiring to change the seat position, the rider can, while riding, unweight the seat, activate actuating control 106 by pulling trigger 112, which pulls cable 46, which in turn pulls cable holdfast 202 and flat tang 204 down, which in turn pulls connecting arms 198R and 198L, which, being hingedly connected to bellcranks 192R and 192L, respectively, rotate bellcranks 192R and 192L about their respective fulcrum pins 194R and 194L, counterclockwise and clockwise, respectively. This causes bellcrank heads 210R and 210L to push against the inward surfaces of locking pin cavities 220R and 220L, respectively, causing locking pins 178R and 178L to be pulled from their respective engagements with detent holes 176R and 176L. Locking pins 178R and 178L will continue to slide inwards within tube 216 until they come to bear against stop pin 218. Tube slots 222R and 222L are long enough to permit as full and unrestricted a travel range of bellcranks 192R and 192L, respectively, as is necessary for allowing as full and complete a travel range of locking pins 178R and 178L that stop pin 218 and detent holes 176R and 176L, respectively, allow. With locking pins 178R and 178L disengaged from their respective detent holes 176R and 176L, the seat is free to move forward, which it is biased to do because of the constant forward pull of seat movement spring 184, which is hooked to eyed boss 188 and seat-shell-attached anchor rod 186, shown in FIG. 9. Front seat-shell-attached support platform 158 is hingedly connected to slider barrel 148, which is free to slide forward along top bar 138. Seat-shell-attached top plate 166 is connected to side plates 162R and 162L as is rear seat-shell-attached support platform 160 through intermediate attachment to support struts 144R and 144L. Side plates 162R and 162L move generally forward, their planular direction of travel being determined by the angle of slots 170R and 170L which slide along about guide pins 172R and 172L, respectively. Guide pin flanges 174R and 174L serve to retain side plates 162R and 162L in square relationship with uprights 134R and 134L, all respectively. The rider elects to move the seat to position two, shown in FIG. 15, and therefore only briefly activates, and then quickly releases trigger 112 of actuating control 106, which first causes locking pins 178R and 178L to release, allowing the seat to move, and then secondly allows pins 178R and 178L to to be pushed against the inside surfaces of side plates 162R and 162L, respectively, between first and second seat position detent holes 176R and 176L. As the seat, and therefore sideplates 162R and 162L move forward, locking pins 178R and 178L will find and lock into the second seat position detent holes 176R and 176L, respectively, because of the locating cooperation among guide pins 172R and 172L, slots 170R and 170L, and detent holes 176R and 176L, respectively, andbecause of the ever constant pin 178R and 178L locking biasing from bellcrank springs 212R and 212L.

If the rider elects to pass over seat position two, this is accomplished by simply keeping trigger 112 activated. or pulled, which keeps locking pins 178R and 178L from locking. The seat can be moved from position one to position four by keeping trigger 112 activated until the seat moves to the forward limit of its range of travel, determined by slider barrel 148 coming to bear against stop 180, and the rear termination of slots 170R and 170L coming to bear against guide pins 172R and 172L, respectively. So, there is the option for the rider to move the seat one position at a time, or several positions, determined by when the rider elects to release trigger 112 after activation. To move the seat backward, the activating, and therefore, actuating, requirements are identical to those for moving the seat forward, except the rider rearwardly weights the seat to manually move it backwards against the easily overcome forward seat movement biasing of spring 184. When moving the seat back to position one from any other position, rear stop 182 provides for the seat rear travel range limit because of slider barrel 148 coming to bear against it,as guide pins 172R and 172L serve also to do when the front terminations of slots 170R and 170L come to bear, respectively, against them.

As briefly alluded to in the structural description, stops 180 and 182 could be slidably, rather than fixedly, engaged about top bar 138 and fitted with set screws to enable them to be position-changably securable for purposes of altering the travel range limits of the seat if the rider would want to limit the number and combinations of positions available to 1 and 2, 1–3, 2 and 3, 2–4, or 3 and 4. Movably securable slot 170R and 170L insertable stops could be employed to alter side plates 162R and 162L travel range limits to correlate with those of slider barrel 148. Removable detent hole 176R and 176L plugs could be employed to insure a nonengagable passing over of a particular set or sets of detent holes 176R and 176L by locking pins 178R and 178L, respectively.

Structural Description of Alternate Embodiment FIGS. 8, 18-21

FIGS. 18 and 20 show a supporting structure 224 and a releasable locking mechanism 226 being a combined intermittently lockable seat position changing assembly and intermediate connection assembly between a conventional seat 229, with its conventional seat support rails 228L and 228R, and conventional seat post 30 with its conventional seat post clamp 32. Both, supporting structure 224 and releasable locking mechanism 226 are symmetrical such that the left side elevational views of FIGS. 18 and 20 shown are mirrored images of their respective right side elevational views ( not shown ). Any part referred to with the suffix "L" after its identifying number means there is a corresponding, mirrored image, right side part.

In FIG. 21, a support base 230 is shown in cross-section, taken on line 21—21 from FIG. 20, that press-fittedly and spot-weldedly incorporates a left support base rail 232L and a right support base rail 232R, with dimensions and spacings suitable for securement within conventional seat post clamp 32, which is clamped conventionally using a seat post clamp bolt 227. Press fitted into receiving holes on either side of base 230 are a left rear swing arm support pin 234L and its counterpart pin 234R, flanged to retain rotatably engaged about them a left rear swing arm 236L and its counterpart arm 236R, respectively. A left rear swing arm stop 238L and its counterpart stop 238R are weldedly attached to either side of base 230 to act as forward travel stops for arms 236L and 236R, respectively, shown best in FIG. 20. Stops 238L and 238R also serve as supports for a conventional-seat-rail accepting clamp 240, shown in FIG. 18. Clamp 240 has a fixed left arm 242L and counterpart arm 242R which are both hingedly connected to swing arms 236L and 236R, respectively, by a transversely spanning connecting pin 244. Accepting clamp 240 is constructed to accept standard diameters and spacings of a conventional seat 229 standard support rails 228L and 228R. A front swing arm 250 is rotatably engaged around a front swing arm fulcrum pin 252, which is press fit into a receiving hole bored all the way through the lower section of clamp 240. A recess is provided around pin 252 in the lower section of clamp 240 to provide clearance for the full travel range that arm 250 rotates within between the frontward and rearward positions of seat 229. The other end of front swing arm 250 is rotatably engaged about a fixed dowel 248, which is fixedly secured by welding to a support base front projection 246, which, itself, is weldedly attached to support base 230. A supporting structure movement spring. 254 is installed around the projecting ends of dowel 248 and hooked to arm 250 and to projection 246 in a manner providing an ever constant counterclockwise ( left view ) rotational bias to arm 250. A locking pin sleeve 258 is press-fit installed in a receiving bore drilled through that portion of front projection 246 that puts sleeve 258 perpendicularly pointed at the center of dowel 248 and non-rubbingly as close as possible to arm 250, so that a locking pin 256, when slidably engaged within sleeve 258, will be able to engage into either a forward position locking pin cavity 264F or a backward position locking pin cavity 264B. Cavities 264F and 264B are bored into arm 250 at locations determining the frontward and rearward seat 229 positions. A locking pin spring 260 is installed between pin 256 and a sleeve cap 262, which is threadedly secured onto sleeve 258, to constantly lockably bias pin 256. Cable 46 is fixedly attached to pin 256 by silver soldering into a receiving center hole bored into pin 256. Cable 46 and sheath 48 run to be attached to actuating control 106, shown in FIG. 8, and described earlier. A front swing arm attached arcuate shoulder stop 266 is integrally affixed with arm 250 which comes to bear against the front side of support base front projection 246, providing a limit for counterclockwise rotation of arm 250.

Arms 242L and 242R can be reconfigured, both in their fixed positional relationship with clamp 240, and in changing their respective hinged connections which reposition their overlapping onto the outsides of arms 236L and 236R, respectively, to overlapping on the insides of arms 236L and 236R, respectively.

Operational Description of Alternate Embodiment FIGS. 8, 18-21

FIG. 18 shows seat 229 in rearward position with accepting clamp 240 resting on stops 238L and 238R, and locking pin 256 engaged in cavity 264B. With the rider unweighting seat 229 and activating trigger 112 of actuating control 106, pin 256 is pulled from cavity 264B, freeing supporting structure 224 to move, which it will do because of the generally forward movement biasing of spring 254. Arm 250 and arms 236L and 236R swing counterclockwise until they come to bear, respectively, against front projection 246, and stops 238L and 238R, at which time cavity 264F has rotated around into position to accept pin 256. As explained before, but to reiterate briefly, trigger 112 can be activated and quickly released, such action pulling pin 256 from cavity 264B, allowing seat 229 to start moving forward so that when trigger 112 is released, pin 256 is pushed by spring 260 against the surface between cavities 264B and 264F, where pin 256 will slide along until it finds and locks into cavity 264F. From this frontward position, seat 229 can be moved back to the rearward position by the rider activating trigger 112, which releases pin 256 from cavity 264F, which frees seat 229 to move, which it will do from a rearward weighting of the rider, easily overcoming the forward movement biasing of spring 254, until arm 250 swings clockwise enough to bring cavity 264B into position to receive pin 256, and accepting clamp 240 comes to rest on top of stops 238L and 238R.

The remaining depicted alternate embodiments will be described for structure and operation together in a less comprehensive manner than earlier described embodiments in order to abbreviate what otherwise could become a burgeoning application. However, believing that on the basis of the familiarization with this invention from earlier descriptions, these less comprehensive alternate embodiment descriptions, included in part to positively establish the possibility for this invention to assume numerous alternate embodiments, will be found adequate by the skilled artisan to be able to build and use same, anyway.

Structural and Operational Description of Alternate Embodiment FIGS. 8-22

FIG. 22 shows a right and left bottom bar 296 clamped into clamp 32. A right and left bottom bar hinge 298 hingedly connect right and left bottom bar 296 to a right and left rear swing arm 290, which are connected to a right and left rear extension arm 286 by a right and left, transversely hinge-pin connected, rear swing arm hinge 292. A rear swing arm spring 294 is installed to arms 290 and 286 to continually bias arms 286 to rotate clockwise relative to arms 290. A rear seat-attached hinge pin 284 runs through a right and left rear extension arm hinge 288, and is fixedly anchored to seat shell 72 on either side with a hinge pin flange 278. A single top bar 282 is weldedly attached to hinge pin 284, and rests on the transverse hinge pin connecting right and left hinge 292, and also runs and is welded to a front swing arm seat-attached hinge pin 276, which is fixedly attached to seat shell 72 on either side by flange 278. A front swing arm 272 is "Y" configured to be weldedly attached to a right and left front swing arm hinge 274, with the single projected end of the "Y" configuration weldedly attached to a front swing arm attached rotatable cylinder 302. A bottom bar attached fixed tube 304 is weldedly attached to right and left bottom bar 296, and has a clearance slot cut into its upper arcuate area to provide clearance for the travel range of arm 272. A releasable locking mechanism 270, comprising a locking pin sleeve 307, a locking pin 306, a locking pin spring 310, and a sleeve cap 311 is situated between right and left bottom bars 296, and serves to lock and unlock rotatable cylinder 302 by intermittent locking and unlocking of pin 306 within a plurality of locking pin cavities 308.

When actuating control 106 is activated, freeing seat shell 72 to move, a seat movement spring 280, biased to rotate arm 272 counterclockwise, causes seat shell 72 to move forward, upward, and to angle. Top bar 282 will continue to rest on the transverse hinge pin between right and left hinge 292 until arms 290 come to bear against a right and left stop 300, when extension arms 286 will then rotate counterclockwise to provide a marked proportional increase in seat angle in the last available position or two. This embodiment shows, then, that combinations of various arm length configurations is possible for varying the proportions of forward, upward, and angular movements. It also shows that a releasable locking mechanism can be located in different areas.

Structural and Operational Description of Alternate Embodiment FIGS. 8-23

FIG. 23 shows a supporting structure 312 and a releasable locking mechanism 314. A right and left bottom bar 328 are conventionally clamped into clamp 32 and are hengedly connected to a right and left rear swing arm 324 by a right and left hinge 330. Arms 324 are connected to a right and left upper hinge 326, which rotatably engage about a rear seat-attached hinge pin 322 that is fastened by a flange 320 to either side of seat shell 72. A single top bar 316 is welded to pin 322 and runs forward to be attached at the nose area of the seat by a seat-attached support shaft 318, transversely installed through a bore in bar 316 and attached to seat shell 72 on either side by a flange 320. Right and left bottom bars 328 converge at bottom bar junction 334 to become a single bottom bar 335, around which is slidably engaged a slider barrel 340, incorporating releasable locking mechanism 314. A rear stop 336 and a front stop 338 provide travel limits for barrel 340. Barrel 340 is hingedly attached to top bar 316 by slider barrel hinge 342, being weldedly connected to a front top bar support rod 344F and a back top bar support rod 344B, with both being weldedly attached to top bar 316. Releasable locking mechanism 314 comprises a sleeve 345, attached to slider barrel 340, a locking pin 346, a locking pin spring 350, and locking pin notches 348, into and out of which pin 346 moves. When the rider activates actuating control 106, releasing pin 346 from the position one notch, the seat will move forward because of the forward movement biasing of seat-movement spring 332. As arms 324 rotate counterclockwise, slider barrel 340 slides along single bottom bar 335, with pin 346 finding and locking into another notch 348, after which other positions forward or backward can, of course, be selected.

Structural and Operational Description of Alternate Embodiment FIGS. 8-24

FIG. 24 shows a supporting structure 352 and releasable locking mechanism 314. A right and left bottom bar 358 are clamped into clamp 32, bending around at their rear extremities to run up and forward to become designated rear bars 360, which in turn bend at their upper travel termination to become horizontal and also converge at bar junction 378 to become one top bar 356, which travels to a forward turnaround junction where it branches to again become right and left bottom bars 358. A right and left rear slider barrel 362 are slidably engaged about rear bars 360, and are hingedly attached to seat shell 72 via a right and left rear slider barrel hinge 364, which in turn are attached to a right and left front support strut 366, and a rear support strut 368, which themselves are attached to a seat-attached support platform 370.

A front seat-attached slider barrel 376 is slidably engaged about top bar 356, and is hingedly attached on either side to a seat-attached support shaft 380, which in turn are fixedly attached to seat shell 72 by a flange 382. A locking pin, spring, and cable assembly, the same as that described for "Alternate Embodiment E", is affixed with slider barrel 376 to lock into and release from various notches along bar 356. Seat movement spring 372, hooked to top bar 356 and rear slider barrel 362 by an eyed boss 374, provides for the forward movement biasing that slides all the slider barrels forward when the locking pin is released from a notch by activation of actuating control 106. The slider barrel shown bracketed by a rectangular dashed line box is an optional location which could be used in place of where barrel 376 is. In that case bottom bars 358 could be made singular forward of bar junction 386, and top bar 356 could be doubled.

Structural and Operational Description of Alternate Embodiment FIGS. 8, 25

FIG. 25 shows a supporting structure 388. Releasable locking mechanism 314, described for "Alternate Embodiment E", can be installed to front slider barrel 394, which incorporates an arcuate longitudinal bore for slidably engaging about a matchingly arcuate top bar 392. Bar 392 can be single forward of bar junction 398, and notched to provide locking positions for the operation of releasable locking mechanism 314 the same as described for "Alternate Embodiment E". Both slider barrels 394 and 396 are attached to seat shell 72 similar to the attachment of barrel 376 described for "Alternate Embodiment F", shown in FIG. 24, A forwardly biased seat movement spring 400 is hooked to an eyed boss 402 at bar 392 and barrel 396. Actuating control 106 is employed for the operation of releasable locking mechanism 314 as earlier described. Slider barrels 394 and 396 slide along bar 392, with releasable locking mechanism 314 enabling intermittent locking in various positions.

Structural and Operational Description of Alternate Embodiment FIGS. 8, 26

FIG. 26 shows a supporting structure 404 and a releasable locking mechanism 406. A right and left bottom bar 408 are clamped into clamp 32 and are hingedly connected to a right and left rear swing arm 410 by a right and left rear swing arm lower hinge 411. A right and left rear swing arm upper hinge 412 is rotatably engaged about a rear seatattached hinge pin 414, which is fixedly attached to seat shell 72 on either side by a flange 416. A fixed housing tube 422 is supportedly connected to bars 408 by a back support member 426 and a front support member 424. A slider rod 418 is slidably engaged within tube 422 and is transversely bored through, near its front end, to slidably receive a seat-attached support shaft 420, which is fixedly attached to seat shell 72 by a flange 416 on either end. Slider rod 418 has a locking pin cavity 432 in four places along its bottom length to accept a locking pin 428 for seat repositioning purposes. A sleeve 427, a spring 430, a cap 431, and cable 46 additionally comprise releasable locking mechanism 406, which is structurally and operationally similar to others described earlier, and also employs actuating control 106 in its operation. With release of pin 428 from a corresponding cavity 432, the seat moves forwardly because of the counterclockwise movement biasing of a seat movement spring 417 on arm 410, which concurrently slides rod 418 forward for pin 428 engagement with another selected cavity 432.

Structural and Operational Description of Alternate Embodiment FIGS. 8, 27-28

FIG. 27 shows a supporting structure 434 and an arrow pointing to where releasable locking mechanism 406, as shown and described in FIG. 26, would be installed. A right and left bottom bar 440 are clamped into clamp 32 and continue rearwards to be integrally affixed with a right and left fixed housing tube 446, which are crosspiece joined with a top bar 438 that travels forward and loops back around to turn into single bottom bar 440, changing direction at bar angle 471 and running to bar junction 442 where it branches into right and left bottom bars 440. A right and left slider rod 444 are slidably engaged within right and left tubes 446, and are transversely hingedly affixed with a seat-attached support shaft 448, which is fixedly attached to seat shell 72 by a flange 450 on either end.

A roller guide support assembly 458 is shown in cross section in FIG. 28. It comprises a roller guide housing 464, which is fixedly attached, on either side, to a support shaft 446, which is rotatably engaged within a support tube 462 on either side, which in turn is fixedly attached to a seat shell attachment plate 460 on either side. A roller member 468 is rotatably engaged around a roller support shaft 470, which is fixedly press fit into receiving bores in either side of housing 464. Roller member 468 is contactingly and conformingly disposed about the upper and lower surfaces of bar 440. This way roller guide support assembly 458 can negotiate bar angle 471 or other bar angles desired to be implemented for purposes of altering the proportions of possible seat plane movements. Forwardly biasing seat movement spring 452 is hooked to an anchor rod 456, which is fixedly attached to seat shell 72 by a flange 450 on either end. The front of spring 452 is hooked to an eyed boss 454 at the upper front end of housing tube 446. Actuating control 106 is employed to trigger releasable locking mechanism 406, which would be located near the upper end of either tube 446, and which would function in the same manner as described earlier, effecting and enabling releasing and locking of a locking pin from and into a plurality of receiving cavities located along the bottom of slider rod 444.

Conclusion, Ramifications, and Scope of Invention

Thus the reader will see that this invention's attributes, which include enabling a bicycle rider or cycletype machine operator to enjoy the benefits of being able to accomodate a change in body position with an advantageous change in the seat position, are significant and manifold.

While the above description contains many specificities, these should not be construed as limitations on the scope of the invention, but rather as an exemplification of a preferred embodiment and some alternate embodiments, thereof. Many other variations are possible. For example, the actuating control can be mounted anywhere feasible on the bicycle or cycle-type machine. Its trigger can be springably hinge mounted to provide over-travel component protection. It could be combined with brake or shift levers to provide a dual function lever option. It could be activated by a twisting rather than a trigger or lever type member. It could embody a lever proximately attached to the releasable locking mechanism, enabling activation by the hand under the nose, side, or rear of the seat. Linkage could be provided from the releasable locking mechanism to an actuator located on the seat for activating by pressing or pulling a triggering member, or could be activated by means requiring a twist of the seat, thigh squeezing of the seat, or other proximately located activating means.

A friction or screw type releasable locking mechanism could be employed to provide infinite variability of selectable positions. Intermediate temporary stops could be employed between the releasably lockable positions requiring release of the actuating control trigger after actuation before a stop releases, insuring that the detent pin finds and locks into the next sequentially in-line detent cavity with no skipping over of sequentially in-line lockable positions possible. The three directional planes can be combined in different proportions and/or sequences of movement. Different materials, sizes, shapes, substitutions of hollow for solid items, etc., and various manufacturing processes can be employed with respect to the componentry, etc.. So, accordingly, the scope of the invention should be determined not by the embodiments illustrated, but by the appended claims and their equivalents.

I claim:

1. A seat position changing apparatus for a bicycle or cycle-type machine, controllable by a rider while riding the bicycle or an operator operating the cycle-type machine, having, in combination, (a) the bicycle with wheels, or the cycle-type machine, (b) a seat post connected to the bicycle or cycle-type machine, (c) a seat clamp effectively connected to the seat post, (d) a seat, comprising a forward and rearward portion, connected to the seat clamp by supporting means, (e) a releasable locking means enabling intermittent seat repositioning effectuations, and, (f) actuating control means for unlocking the releasable locking means, wherein, the improvement comprises, a seat supporting structure, having

- (g) bar type members, adjustably and removably secured to, and frontwardly and rearwardly exited from, the seat clamp, with,
- (h) interconnecting means connecting the rearward portion of the seat and the rearward portion of the bar type members for fore and aft and angular movement of the rearward portion of the seat relative to the bar type members, and,
- (i) interconnecting means connecting the forward portion of the seat and the frontward portion of the bar type members for fore and aft and angular movement of the forward portion of the seat relative to the bar type members.

2. The apparatus of claim 1, wherein, the interconnecting means connecting the rearward portion of the seat and the rearward portion of the bar type members include a cylinder transversely affixed to the rearward portion of the bar type members with a drum rotatably engaged about the cylinder and interconnected to the rearward portion of the seat.

3. In claim 2, wherein, the bar type members are essentially parallel to each other at their generally rearward end areas, and are fitted into receiving holes that the cylinder has, said holes being located near either end of the cylinder.

4. In claim 2, wherein, the drum is approximately the same length as the cylinder, said drum having slots near either end to provide clearance for the bar type members and rotational range limits for the drum.

5. In claim 2, wherein, the interconnection between the drum and the rearward portion of the seat include arm type members, affixed at substantially either end of the drum, being intermittently movably spatially oriented relative to, and effectively affixed to, the rearward portion of the seat.

6. In claim 2, the cylinder further comprising a sleeve inserted into a bore placed perpendicularly to, and at the approximate center of, said cylinder.

7. In claim 6, the sleeve further comprising a locking pin slidably engagable into any one of a plurality of receiving cavities that the drum has.

8. In claim 7, the drum further comprising a slot at its approximate center to provide clearance for a portion of the sleeve that protrudes from the cylinder.

9. The apparatus of claim 1, wherein, the clamp, including any member clampable therewith, remains immovably spatially oriented relative to the seat post during the intermittent seat repositioning effectuations while riding.

* * * * *